US012387683B2

(12) United States Patent
Wang et al.

(10) Patent No.: US 12,387,683 B2
(45) Date of Patent: Aug. 12, 2025

(54) PIXEL DRIVING CIRCUIT AND DRIVING METHOD THEREFOR, DISPLAY SUBSTRATE, AND DISPLAY DEVICE

(71) Applicant: BOE TECHNOLOGY GROUP CO., LTD., Beijing (CN)

(72) Inventors: Li Wang, Beijing (CN); Lujiang Huangfu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/430,044

(22) Filed: Feb. 1, 2024

(65) Prior Publication Data

US 2024/0177676 A1 May 30, 2024

Related U.S. Application Data

(62) Division of application No. 17/794,321, filed as application No. PCT/CN2021/089899 on Apr. 26, 2021, now abandoned.

(30) Foreign Application Priority Data

Apr. 30, 2020 (CN) ......................... 202010364694.2

(51) Int. Cl.
*G09G 3/3258* (2016.01)

(52) U.S. Cl.
CPC ... *G09G 3/3258* (2013.01); *G09G 2300/0852* (2013.01); *G09G 2310/0278* (2013.01);
(Continued)

(58) Field of Classification Search
CPC ......... G09G 3/3258; G09G 2300/0852; G09G 2310/0278; G09G 2310/061;
(Continued)

(56) References Cited

U.S. PATENT DOCUMENTS 9,858,863 B2 1/2018 Kim et al.
2012/0019504 A1 1/2012 Han et al.
(Continued)

FOREIGN PATENT DOCUMENTS

CN 104715714 A 6/2015
CN 105336292 A 2/2016
(Continued)

OTHER PUBLICATIONS

Office Action on the U.S. Appl. No. 17/794,321 issued by the USPTO on Feb. 9, 2023.
(Continued)

*Primary Examiner* — Hong Zhou
(74) *Attorney, Agent, or Firm* — XSENSUS LLP

(57) ABSTRACT

A pixel circuit includes a data writing sub-circuit, a reset sub-circuit and a leakage prevention sub-circuit. The data writing sub-circuit is configured to: in a data writing period, store a light-emitting compensation signal in response to a gate scan signal from a first scan signal terminal and a data signal from a data signal terminal; and in a light-emitting period, assist in controlling the light-emitting control sub-circuit to be turned on according to the light-emitting compensation signal. The reset sub-circuit is configured to: in a reset period, transmit an initial voltage signal to the data writing sub-circuit and the leakage prevention sub-circuit in response to a reset scan signal from a second scan signal terminal. The leakage prevention sub-circuit is configured to: in the data writing period, store another light-emitting compensation signal; and in the light-emitting period, inhibit leakage of the reset sub-circuit according to the another light-emitting compensation signal.

13 Claims, 18 Drawing Sheets

(52) U.S. Cl.
CPC ................. *G09G 2310/061* (2013.01); *G09G 2320/0233* (2013.01); *G09G 2320/0247* (2013.01)

(58) Field of Classification Search
CPC .... G09G 2320/0233–0247; G09G 2300/0819; G09G 2300/0861; G09G 2310/0251; G09G 2310/0262; G09G 3/3233; G09G 3/3208
See application file for complete search history.

(56) References Cited

U.S. PATENT DOCUMENTS

| | | | | |
|---|---|---|---|---|
| 2015/0062193 | A1* | 3/2015 | Kanda .................. | G09G 3/3291 345/77 |
| 2018/0197476 | A1 | 7/2018 | Xi et al. | |
| 2019/0057648 | A1 | 2/2019 | Xu | |
| 2019/0304373 | A1 | 10/2019 | Wang et al. | |
| 2020/0320937 | A1* | 10/2020 | Yang .................... | G09G 3/3258 |
| 2020/0388226 | A1 | 12/2020 | Zhao et al. | |
| 2021/0134224 | A1 | 5/2021 | He et al. | |
| 2021/0174739 | A1 | 6/2021 | Lu et al. | |
| 2022/0102459 | A1 | 3/2022 | Yang et al. | |
| 2023/0042966 | A1 | 2/2023 | Huangfu et al. | |
| 2023/0048014 | A1 | 2/2023 | Wang et al. | |
| 2023/0186850 | A1 | 6/2023 | Wang et al. | |

FOREIGN PATENT DOCUMENTS

| | | | |
|---|---|---|---|
| CN | 106875893 | A | 6/2017 |
| CN | 107481668 | A | 12/2017 |
| CN | 108847186 | A | 11/2018 |
| CN | 109785797 | A | 5/2019 |
| CN | 110349997 | A | 10/2019 |
| CN | 110648629 | A | 1/2020 |
| CN | 110767163 | A | 2/2020 |
| CN | 110910825 | A | 3/2020 |
| CN | 111179859 | A | 5/2020 |
| CN | 210722408 | U | 6/2020 |
| CN | 111445848 | A | 7/2020 |
| CN | 111627387 | A | 9/2020 |
| CN | 112017593 | A | 12/2020 |
| CN | 112289267 | A | 1/2021 |
| JP | H04251818 | A | 9/1992 |

OTHER PUBLICATIONS

Non-Final Office Action on the U.S. Appl. No. 17/794,321 issued by the USPTO on Jun. 26, 2023.
Final Office Action on the U.S. Appl. No. 17/794,321 issued by the USPTO Nov. 2, 2023.
International Search Report and Written Opinion on the International Patent Application No. PCT/CN2021/089899 issued by the International Searching Authority on Jul. 15, 2021.
First Office Action on the Chinese Patent Application No. 202010364694.2 issued by the Chinese Patent Office on Dec. 10, 2020.
Second Office Action on the Chinese Patent Application No. 202010364694.2 issued by the Chinese Patent Office on Apr. 8, 2021.

* cited by examiner

PIXEL DRIVING CIRCUIT AND DRIVING METHOD THEREFOR, DISPLAY SUBSTRATE, AND DISPLAY DEVICE

CROSS-REFERENCE TO RELATED APPLICATIONS

This application is a divisional application of U.S. patent application Ser. No. 17/794,321, filed on Jul. 21, 2022, which claims priority to International Patent Application No. PCT/CN2021/089899, filed on Apr. 26, 2021, which claims priority to Chinese Patent Application No. 202010364694.2, filed on Apr. 30, 2020, which are incorporated herein by reference in their entirety.

TECHNICAL FIELD

The present disclosure relates to the field of display technologies, and in particular, to a pixel driving circuit and a driving method therefor, a display substrate, and a display device.

BACKGROUND

At present, organic light-emitting diode (OLED) display devices have been widely used due to their properties such as self-luminescence, fast response, wide viewing angle, and the fact that components can be manufactured on flexible substrates. The OLED display device includes sub-pixels each including a pixel driving circuit and a light-emitting device. The light-emitting device is driven to emit light by the pixel driving circuit, thereby realizing display.

SUMMARY

In an aspect, a pixel driving circuit is provided. The pixel driving circuit includes a data writing sub-circuit, a light-emitting control sub-circuit, a reset sub-circuit and a leakage prevention sub-circuit. The data writing sub-circuit is coupled to a first scan signal terminal, a data signal terminal, a first power supply voltage terminal and the light-emitting control sub-circuit. The data writing sub-circuit is configured to: in a data writing period, store a light-emitting compensation signal in response to a gate scan signal from the first scan signal terminal and a data signal from the data signal terminal; and in a light-emitting period, assist in controlling the light-emitting control sub-circuit to be turned on according to the light-emitting compensation signal. The light-emitting control sub-circuit is coupled to the first power supply voltage terminal, a light-emitting control signal terminal and a light-emitting device, and the light-emitting device is further coupled to a second power supply voltage terminal. The light-emitting control sub-circuit is configured to be turned on in response to a light-emitting control signal provided by the light-emitting control signal terminal and the light-emitting compensation signal stored in the data writing sub-circuit in the light-emitting period, so as to drive the light-emitting device to emit light. The reset sub-circuit is coupled to a second scan signal terminal, an initial voltage terminal, the leakage prevention sub-circuit, the data writing sub-circuit and the light-emitting device. The reset sub-circuit is configured to: in a reset period, transmit an initial voltage signal from the initial voltage terminal to the data writing sub-circuit, the leakage prevention sub-circuit and the light-emitting device in response to a reset scan signal from the second scan signal terminal to reset the data writing sub-circuit, the leakage prevention sub-circuit and the light-emitting device. The leakage prevention sub-circuit is coupled to an auxiliary voltage terminal, the first scan signal terminal and the data writing sub-circuit. The leakage prevention sub-circuit is configured to: in the data writing period, store another light-emitting compensation signal; and in the light-emitting period, inhibit leakage of the reset sub-circuit according to the another light-emitting compensation signal. The auxiliary voltage terminal is configured to provide a constant voltage.

In some embodiments, the auxiliary voltage terminal and one of the initial voltage terminal and the second power supply voltage terminal in the pixel driving circuit are a same voltage terminal.

In some embodiments, the auxiliary voltage terminal and the initial voltage terminal in the pixel driving circuit are the same voltage terminal.

In some embodiments, the leakage prevention sub-circuit includes at least one first storage capacitor and a seventh transistor. A first electrode of a first storage capacitor is coupled to the initial voltage terminal, and a second electrode of the first storage capacitor is coupled to the reset sub-circuit. A first electrode of the seventh transistor is coupled to the second electrode of the first storage capacitor, a second electrode of the seventh transistor is coupled to the data writing sub-circuit, and a control electrode of the seventh transistor is coupled to the first scan signal terminal. The first storage capacitor is configured to be discharged in the light-emitting period to continuously provide the another light-emitting compensation signal to the reset sub-circuit.

In some embodiments, the reset sub-circuit includes a fifth transistor and a sixth transistor group. The sixth transistor group includes at least two sixth transistors that are connected in series. A control electrode of the fifth transistor is coupled to the second scan signal terminal, a first electrode of the fifth transistor is coupled to the initial voltage terminal, and a second electrode of the fifth transistor is coupled to an anode of the light-emitting device. Control electrodes of all the sixth transistors in the sixth transistor group are coupled to the second scan signal terminal, a first electrode of a first sixth transistor in the sixth transistor group is coupled to the data writing sub-circuit, and a second electrode of a last sixth transistor in the sixth transistor group is coupled to the initial voltage terminal. The second electrode of the first storage capacitor is coupled to a connection line between any two adjacent sixth transistors in the sixth transistor group.

In some embodiments, the sixth transistors in the sixth transistor group are oxide semiconductor thin film transistors.

In some embodiments, the sixth transistor group includes two sixth transistors that are connected in series. The second electrode of the first storage capacitor is coupled to a connection line between the two sixth transistors.

In some embodiments, the sixth transistor group includes three sixth transistors that are connected in series. The second electrode of the first storage capacitor is coupled to a connection line between the first sixth transistor and a second sixth transistor, or the second electrode of the first storage capacitor is coupled to a connection line between the second sixth transistor and a third sixth transistor.

In some embodiments, the leakage prevention sub-circuit includes two first storage capacitors, a second electrode of a first storage capacitor is coupled to the connection line between the first sixth transistor and the second sixth transistor, and a second electrode of another first storage capacitor is coupled to the connection line between the second sixth transistor and the third sixth transistor.

In some embodiments, the data writing sub-circuit includes a second storage capacitor; the light-emitting control sub-circuit includes a driving transistor, and a second electrode of the second storage capacitor is coupled to a control electrode of the driving transistor. The second electrode of the seventh transistor and the first electrode of the first sixth transistor in the sixth transistor group are both coupled to the second electrode of the second storage capacitor.

In some embodiments, a first electrode of the second storage capacitor is coupled to the first power supply voltage terminal.

In some embodiments, the data writing sub-circuit further includes a first transistor and a second transistor group. A control electrode of the first transistor is coupled to the first scan signal terminal, a first electrode of the first transistor is coupled to the data signal terminal, and a second electrode of the first transistor is coupled to a first electrode of the driving transistor. The second transistor group includes at least two second transistors that are connected in series; control electrodes of all the second transistors in the second transistor group are coupled to the first scan signal terminal, a first electrode of a first second transistor in the second transistor group is coupled to the control electrode of the driving transistor, and a second electrode of a last second transistor in the second transistor group is coupled to a second electrode of the driving transistor.

In some embodiments, the second transistors in the second transistor group are oxide semiconductor thin film transistors.

In some embodiments, the number of the second transistors in the second transistor group is two.

In some embodiments, the light-emitting control sub-circuit further includes a third transistor and a fourth transistor. A control electrode of the third transistor is coupled to the light-emitting control signal terminal, a first electrode of the third transistor is coupled to the first power supply voltage terminal, and a second electrode of the third transistor is coupled to a first electrode of the driving transistor. A control electrode of the fourth transistor is coupled to the light-emitting control signal terminal, a first electrode of the fourth transistor is coupled to a second electrode of the driving transistor, and a second electrode of the fourth transistor is coupled to the anode of the light-emitting device.

In another aspect, a driving method for the pixel driving circuit according to any one of the above embodiments is provided, a light-emitting driving period includes the reset period, the data writing period, and the light-emitting period. The driving method includes: in the reset period: transmitting, by the reset sub-circuit, the initial voltage signal from the initial voltage terminal to the data writing sub-circuit, the leakage prevention sub-circuit and the light-emitting device in response to the reset scan signal from the second scan signal terminal to reset the data writing sub-circuit, the leakage prevention sub-circuit and the light-emitting device; in the data writing period: in response to the gate scan signal from the first scan signal terminal and the data signal from the data signal terminal, storing, by the data writing sub-circuit, the light-emitting compensation signal, and storing, by the leakage prevention sub-circuit, the another light-emitting compensation signal; and in the light-emitting period: the light-emitting control sub-circuit being turned on in response to the light-emitting control signal provided by the light-emitting control signal terminal and the light-emitting compensation signal stored in the data writing sub-circuit to drive the light-emitting device to emit light, and inhibiting, by the leakage prevention sub-circuit, the leakage of the reset sub-circuit according to the another light-emitting compensation signal.

In yet another aspect, a display substrate is provided. The display substrate includes the pixel driving circuit as described in any of the above embodiments.

In yet another aspect, a display device is provided. The display device includes the display substrate as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
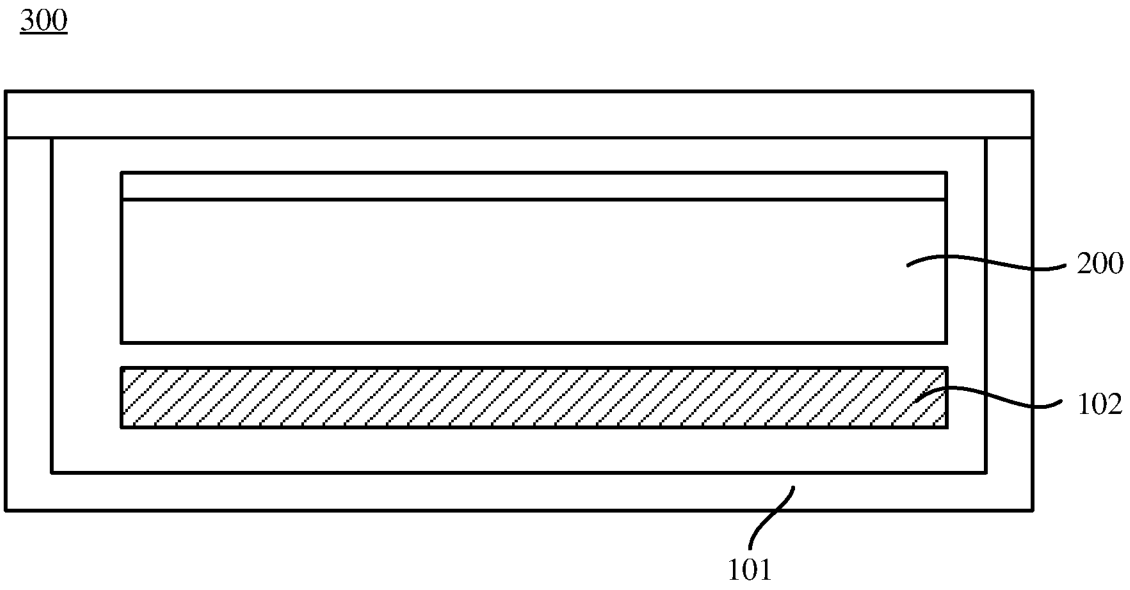
FIG. 1 is a structural diagram of a display device provided in some embodiments of the present disclosure.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "For example embodiments", "example", "specific example" or "some examples" are intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, terms such as "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" used herein has an open and inclusive meaning, which does not exclude devices that are applicable to or configured to perform additional tasks or steps.

In addition, the phase "based on" used herein is meant to be open and inclusive, since a process, step, calculation or other action that is "based on" one or more of the stated conditions or values may, in practice, be based on additional conditions or value other than those stated.

As used herein, terms such as "about", "substantially" or "approximately" include a stated value and an average value within an acceptable range of deviation of a particular value. The acceptable range of deviation is determined by a person of ordinary skill in the art in view of the measurement in question and errors associated with the measurement of a particular quantity (i.e., limitations of the measurement system).

Some embodiments of the present disclosure provide a display device. As shown in FIG. 1, the display device 300 includes, for example, a frame 101, and a display substrate 200, a circuit board 102, a display driver integrated circuit (abbreviated as IC) and other electronic accessories that are all disposed in the frame 101.

The display device 300 may be any device that displays an image, whether in motion (e.g., a video) or stationary (e.g., a still image), and whether textual or graphical. For example, the display device 300 may include a mobile telephone, a wireless device, a personal data assistant (PDA), a hand-held or portable computer, a global positioning system (GPS) receiver/navigator, a camera, an MP3 player, a video camera, a game console, a watch, a clock, a calculator, a television (TV) monitor, a flat panel display, a computer monitor, an automotive display (e.g., an odometer display), a navigator, a cockpit controller and/or display, a camera view display (e.g., a rear view camera display in a vehicle), an electronic photo, an electronic billboard or sign, a projector, an architectural structure, and a packaging and aesthetic structure (e.g., a display for an image of a piece of jewelry), etc.

The display substrate 200 may be a liquid crystal display (abbreviated as LCD) substrate, an organic light-emitting diode (abbreviated as OLED) display substrate, a quantum dot light-emitting diode (abbreviated as QLED) display substrate, etc., which is not specifically limited in the embodiments of the present disclosure.

The following embodiments of the present disclosure are described by taking an example in which the display substrate 200 is the OLED display substrate.

Figure 2A:
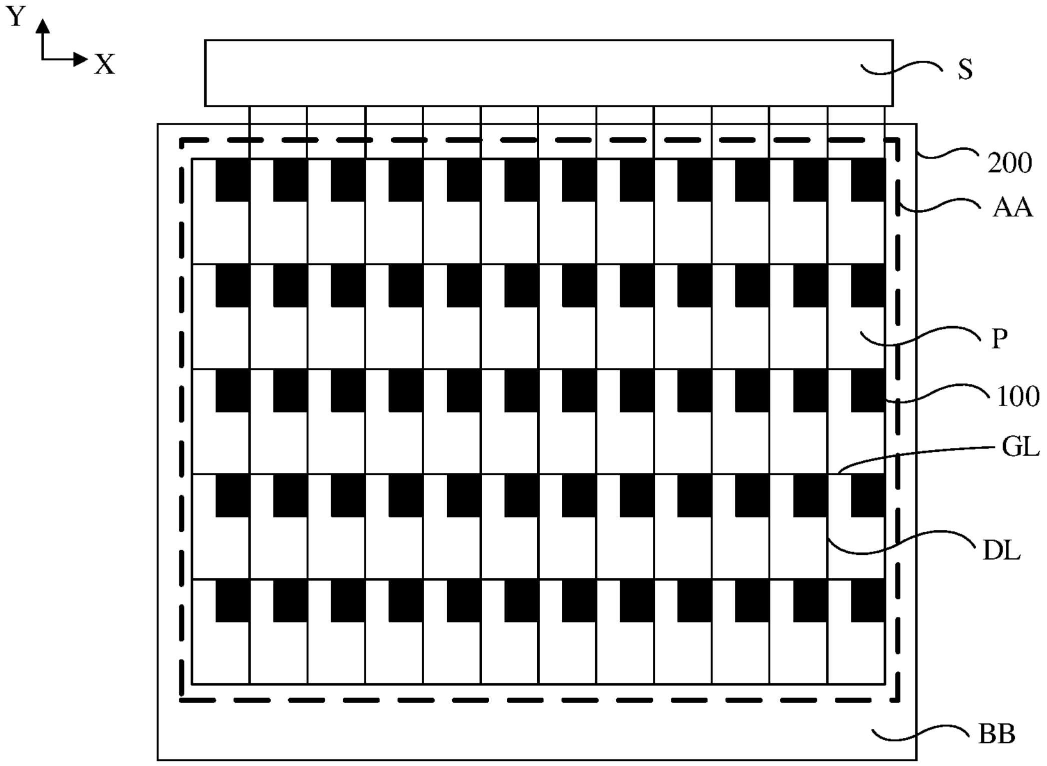
FIG. 2A is a pixel layout diagram of a display substrate provided in some embodiments of the present disclosure.

As shown in FIG. 2A, the display substrate 200 has an active area AA and a peripheral area BB located on at least one side of the active area AA. FIG. 2A illustrates a case in which the peripheral area BB is disposed around the active area AA, and it can be understood that the relationship is not limited thereto in the embodiments of the present disclosure.

With continued reference to FIG. 2A, the display substrate 200 includes sub-pixels P of a plurality of colors disposed in the active area AA. In some examples, the sub-pixels of the plurality of colors include at least sub-pixels of a first color, sub-pixels of a second color and sub-pixels of a third color. For example, the first color, the second color and the third color are three primary colors (e.g., red, green and blue).

For convenience of description, some embodiments of the present disclosure are described by taking an example in which the sub-pixels P are arranged in a matrix. In this case, sub-pixels P arranged in a row in a first direction (e.g., the lateral direction X in FIG. 2A) is referred to as sub-pixels in a same row; and sub-pixels P arranged in a row in a second direction (e.g., the vertical direction Y in FIG. 2A) are referred to as sub-pixels in a same column.

Figure 2B:
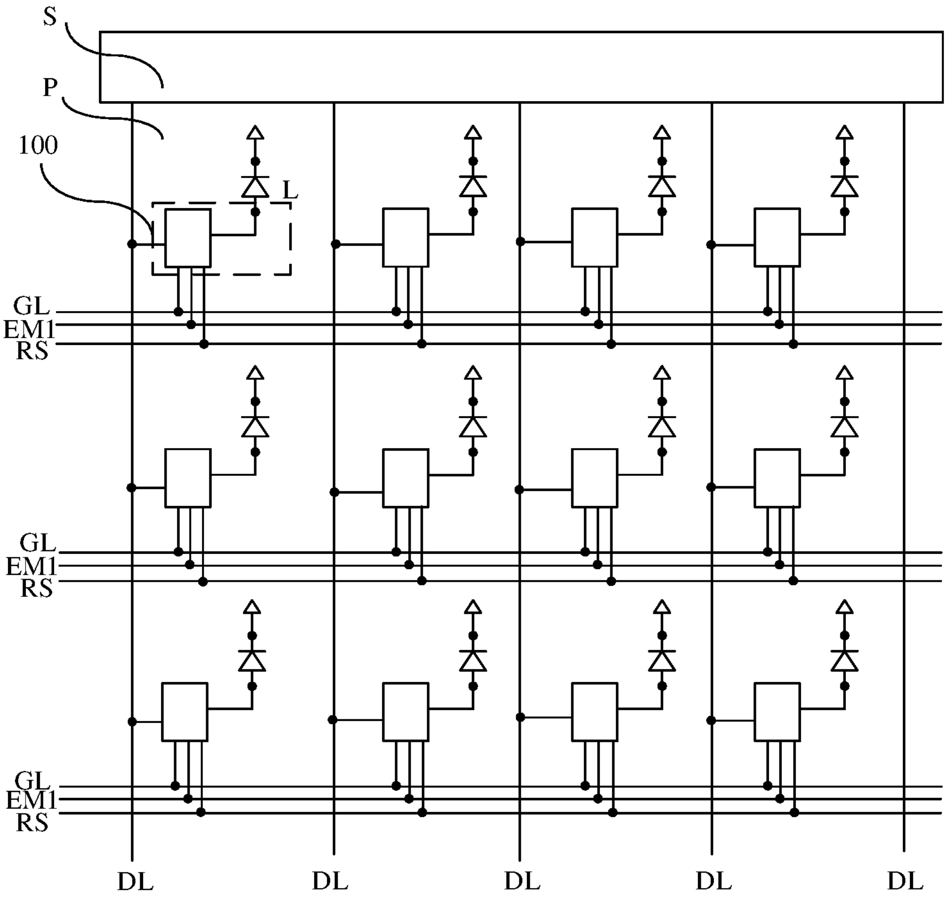
FIG. 2B is a pixel configuration diagram of a display substrate provided in some embodiments of the present disclosure.

In some examples, as shown in FIG. 2B, the sub-pixels P in the same row may be connected to a gate line GL, a light-emitting control signal line EM1, and a reset scan signal line RS. The sub-pixels P in the same column may be connected to a data line DL.

Each sub-pixel P is provided therein with a pixel driving circuit 100 for controlling display of the sub-pixel P. A plurality of pixel driving circuits 100 are disposed on a base substrate of the display substrate. A gate line GL connected to a sub-pixel P is configured to transmit a gate scan signal Gate to a pixel driving circuit 100 of the sub-pixel P. A light-emitting control signal line EM1 connected to the sub-pixel P is configured to transmit a light-emitting control signal to the pixel driving circuit 100 of the sub-pixel P. A reset scan signal line RS connected to the sub-pixel P is configured to transmit a reset scan signal to the pixel driving circuit 100 of the sub-pixel P. A data line DL connected to the sub-pixel P is configured to transmit a data signal to the pixel driving circuit 100 of the sub-pixel P. The data signal comes from a source driver S coupled to the data lines DL.

It will be noted that, for a first scan signal terminal S1 and a second scan signal terminal S2 mentioned in some of following embodiments, a signal line coupled to the first scan signal terminal S1 may be a gate line GL, and a signal line coupled to the second scan signal terminal S2 may be a reset scan signal line RS.

For example, as shown in FIG. 2B, the pixel driving circuit 100 includes a plurality of transistors. The plurality of transistors constitute a plurality of sub-circuits with different functions in the pixel driving circuit 100.

It will be noted that the transistors of the pixel driving circuit 100 provided in some embodiments of the present disclosure may be thin film transistors (abbreviated as TFT), field effect transistors (e.g., metal oxide semiconductor field effect transistors (abbreviated as MOSFETs)) or other switching devices with same properties. For convenience of description, some embodiments of the present disclosure are described by taking the thin film transistors as an example.

A control electrode of each thin film transistor of the pixel driving circuit 100 is a gate of the thin film transistor, a first electrode of the thin film transistor is one of a source and a drain of the thin film transistor, and a second electrode of the thin film transistor is another of the source and the drain of the thin film transistor. Since the source and the drain of the thin film transistor can be symmetrical in structure, the source and the drain of the thin film transistor can be structurally indistinguishable. That is, the first electrode and the second electrode of the thin film transistor in some embodiments of the present disclosure can be structurally indistinguishable. For example, in a case where the thin film transistor is a P-type transistor, a first electrode of the thin film transistor may be a source, and a second electrode of the thin film transistor may be a drain. As another example, in a case where the thin film transistor is an N-type transistor, the first electrode of the transistor may be the drain, and the second electrode of the transistor may be the source.

For convenience of description, the pixel driving circuit 100 provided in some embodiments of the present disclosure is described by taking an example in which the thin film transistors are all P-type transistors. It will be noted that the embodiments of the present disclosure include but are not limited to the above examples. For example, one or more thin film transistors in the pixel driving circuit 100 provided in some embodiments of the present disclosure may also be N-type transistor(s). In this case, it is only necessary to make electrodes of selected type of thin film transistor(s) be coupled with reference to electrodes of corresponding thin film transistor(s) in some embodiments of the present disclosure, and make corresponding voltage terminal(s) provide a corresponding high-level voltage or low-level voltage.

Figure 3:
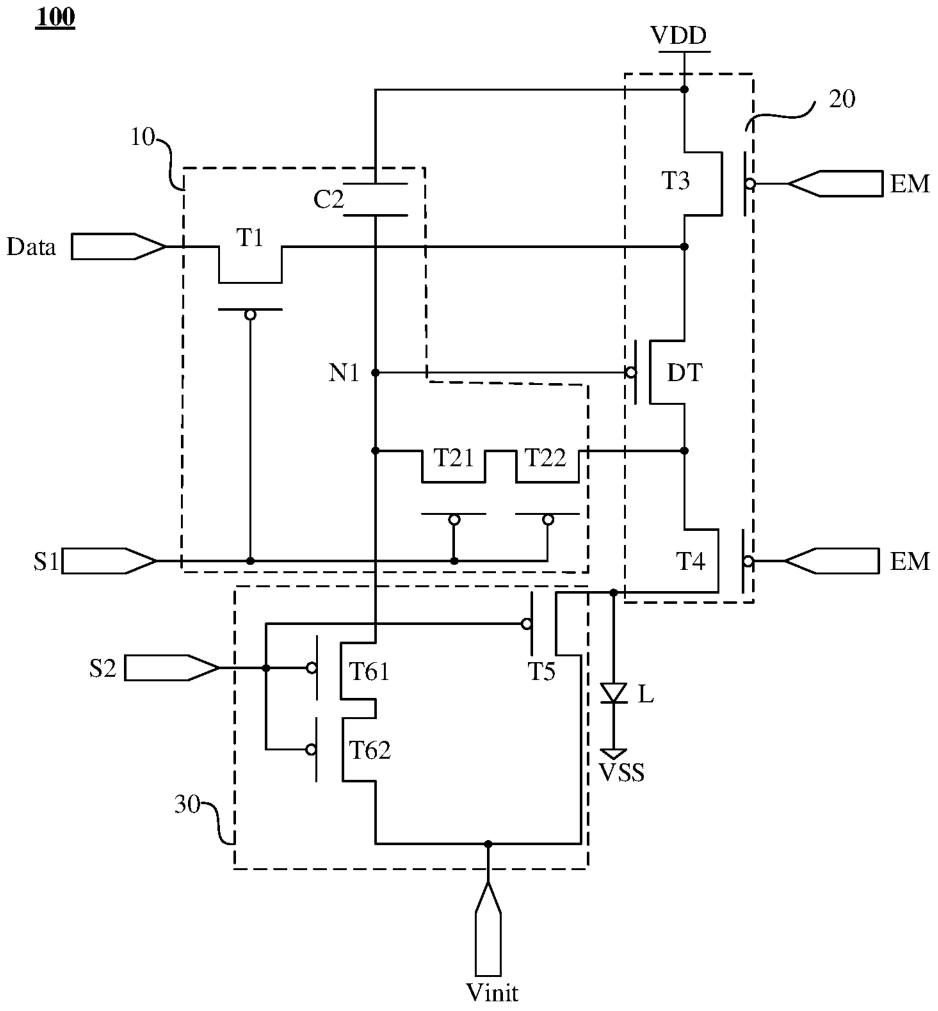
FIG. 3 is a configuration diagram of a pixel driving circuit provided in some embodiments of the present disclosure.

In some embodiments, referring to FIG. 3, the pixel driving circuit 100 includes a data writing sub-circuit 10, a light-emitting control sub-circuit 20 and a reset sub-circuit 30.

For example, the data writing sub-circuit 10 includes a second storage capacitor C2. The light-emitting control sub-circuit 20 includes a third transistor T3, a driving transistor DT, and a fourth transistor T4.

A first electrode of the second storage capacitor C2 is coupled to a first power supply voltage terminal VDD, and a second electrode of the second storage capacitor C2 is coupled to a control electrode of the driving transistor DT. A control electrode of the third transistor T3 is coupled to a light-emitting control signal terminal EM, a first electrode of the third transistor T3 is coupled to the first power supply voltage terminal VDD, and a second electrode of the third transistor T3 is coupled to a first electrode of the driving transistor DT. A control electrode of the fourth transistor T4 is coupled to the light-emitting control signal terminal EM, a first electrode of the fourth transistor T4 is coupled to a second electrode of the driving transistor DT, and a second electrode of the fourth transistor T4 is coupled to an anode of the light-emitting device L. A cathode of the light-emitting device L is coupled to a second power supply voltage terminal VSS.

The light-emitting device L may be a diode with self-luminous properties, such as an OLED, a QLED, or a light-emitting diode (LED), which may be chosen by those skilled in the art according to actual needs.

The first power supply voltage terminal VDD is configured to provide a first voltage, such as a direct-current high-level signal. The second power supply voltage terminal VSS is configured to provide a second voltage, such as a direct-current low-level signal.

The third transistor T3 and the fourth transistor T4 are switching transistors, and are coupled to the light-emitting control signal line EM1. The third transistor T3 and the fourth transistor T4 are turned on or off under control of a light-emitting control signal transmitted via the light-emitting control signal line EM1. The driving transistor DT is coupled to the second electrode of the second storage capacitor C2, and is turned on or off under control of a light-emitting compensation signal stored in the second storage capacitor C2. Therefore, in a case where the third transistor T3, the driving transistor DT and the fourth transistor T4 are all turned on, the light-emitting control sub-circuit 20 is turned on, and the light-emitting device L may be driven to emit light.

For convenience of description, a connection point between the control electrode of the driving transistor DT and the second electrode of the second storage capacitor C2 is defined as a first node N1 below.

In a case where the first node N1 is coupled to another transistor besides the driving transistor DT, when the another transistor is in an off state, a leakage current is likely to be generated due to a potential difference between two electrodes of the another transistor. As a result, the light-emitting compensation signal output by the second storage capacitor C2 is affected. That is, a voltage of the control electrode of the driving transistor DT is easily changed. Therefore, an output current of the driving transistor is unstable, which will adversely affect brightness of the light-emitting device. In this way, the leakage current in the pixel driving circuit will affect luminance uniformity of the light-emitting device, and thus easily leads to a flickering display.

In light of this, with continued reference to FIG. 3, the data writing sub-circuit 10 of the pixel driving circuit 100 provided in some embodiments of the present disclosure further includes a first transistor T1 and a second transistor group. The second transistor group includes at least two second transistors that are connected in series. A control electrode of the first transistor T1 is coupled to the first scan signal terminal S1, a first electrode of the first transistor T1 is coupled to the data signal terminal Data, and a second electrode of the first transistor T1 is coupled to the first electrode of the driving transistor DT. A first electrode of a first second transistor (e.g., T21) in the second transistor group is coupled to the first node N1. Control electrodes of the second transistors (e.g., T21 and T22) in the second transistor group are coupled to the first scan signal terminal S1. A second electrode of a last second transistor (e.g., T22) in the second transistor group is coupled to the second electrode of the driving transistor DT.

It will be noted that, in the pixel driving circuit 100, transistors other than the driving transistor DT are switching transistors. An off-state current of each switching transistor satisfies the formula as follows:

$$I_{sub} = \mu_s C_{ox} \frac{W}{L} V_{sth}^2 \exp\left(\frac{V_{GT}}{V_{sth}}\right)\left[1 - \exp\left(-\frac{V_{DS}}{V_{sth}}\right)\right].$$

Where $I_{sub}$ is an off-state current, $\mu_s$ is an electron mobility, $C_{ox}$ is a gate oxide capacitance per unit area in the transistor, W/L is a width-to-length ratio of a conductive channel of the transistor, $V_{sth}$ is a threshold voltage, $V_{GT}$ is a gate-source voltage, and $V_{DS}$ is a drain-source voltage.

Thus, in a case where characteristic parameters of the switching transistor itself (e.g., $\mu_s$, $C_{ox}$, W/L, and $V_{sth}$) are determined, the off-state current $I_{sub}$ is related to the drain-source voltage $V_{DS}$. Therefore, in a case where the switching transistor is in the off state, if the source-drain voltage $V_{DS}$ of the switching transistor is controlled to be relatively small or approximately equal to zero, $$\left[1 - \exp\left(-\frac{V_{DS}}{V_{sth}}\right)\right]$$

in the formula is equal to or approximately equal to zero. That is, $I_{sub}$ is also equal or approximately equal to zero. In this way, leakage of the switching transistor may be effectively prevented. In some embodiments of the present disclosure, by arranging the second transistor group in the data writing sub-circuit 10, in which the second transistors are connected in series, it may be possible to effectively prevent the light-emitting compensation signal stored in the second storage capacitor C2 from fluctuating due to leakage of a second transistor coupled thereto, which helps keep a potential of the first node N1 stable, thereby ensuring that the light-emitting device L is stably controlled to emit light.

Figure 4:
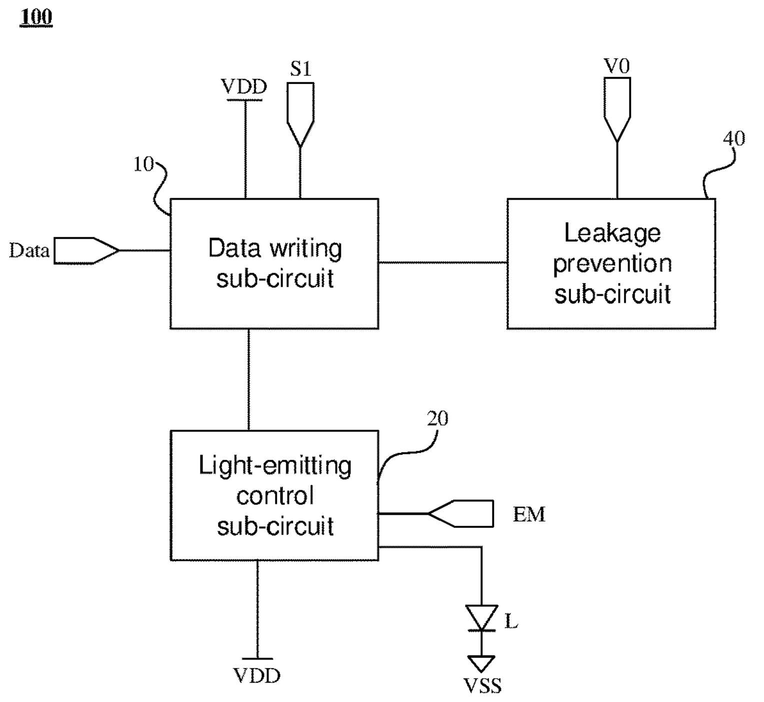
FIG. 4 is a structural diagram of another pixel driving circuit provided in some embodiments of the present disclosure.

Based on this, referring to FIG. 4, in some embodiments of the present disclosure, the pixel driving circuit 100 further includes a leakage prevention sub-circuit 40.

The data writing sub-circuit 10 is coupled to the first scan signal terminal S1, the data signal terminal Data and the light-emitting control sub-circuit 20. The data writing sub-circuit 10 is configured to: in a data writing period, store a light-emitting compensation signal V1 in response to a gate scan signal from the first scan signal terminal S1 and a data signal $V_{data}$ from the data signal terminal Data; and in a light-emitting period, assist in controlling the light-emitting control sub-circuit 20 to be turned on according to the light-emitting compensation signal V1.

The leakage prevention sub-circuit 40 is coupled to an auxiliary voltage terminal V0 and the data writing sub-circuit 10. The leakage prevention sub-circuit 40 is configured to: in the data writing period, store another light-emitting compensation signal V1; and in the light-emitting period, inhibit leakage of the data writing sub-circuit 10 according to the another light-emitting compensation signal V1.

It will be noted that the auxiliary voltage terminal V0 in the pixel driving circuit 100 is configured to provide a constant voltage. The auxiliary voltage terminal V0 is a voltage terminal that can provide the constant voltage. The auxiliary voltage terminal V0 may be an existing voltage terminal in the display substrate. For example, the auxiliary voltage terminal V0 may be the first power supply voltage terminal VDD, the second power supply voltage terminal VSS, an initial voltage terminal Vinit, a reference voltage terminal Vref, a turn-on voltage terminal VGH, a turn-off voltage terminal VGL, or the like, which may be chosen by those skilled in the art according to actual needs.

A structure of the leakage prevention sub-circuit 40 may be set according to actual needs.

For example, referring FIGS. 6A, 6B, 7A, 7B, 8A, 8B, 9A and 9B, the leakage prevention sub-circuit 40 includes first storage capacitor(s) C1. A first electrode of the first storage capacitor C1 is coupled to the auxiliary voltage terminal (e.g., the first power supply voltage terminal VDD), and a second electrode of the first storage capacitor C1 is coupled to the data writing sub-circuit 10. The first storage capacitor C1 is configured to be charged in the data writing period to store the another light-emitting compensation signal V1; and is configured to be discharged in the light-emitting period to continuously provide the another light-emitting compensation signal V1 to the data writing sub-circuit 10.

In the case where the data writing sub-circuit 10 includes the second transistor group, that the second electrode of the first storage capacitor C1 is coupled to the data writing sub-circuit 10 means that the second electrode of the first storage capacitor C1 is coupled to a connection line between any two adjacent second transistors in the second transistor group.

Thus, in the light-emitting period, potentials of a second electrode and a first electrode of a second transistor coupled to the first storage capacitor C1 in the second transistor group are the same or approximately the same due to the another light-emitting compensation signal stored in the first storage capacitor C1, which helps prevent leakage of the second transistor coupled to the first node N1, and may thus inhibit the leakage of the data writing sub-circuit 10. As a result, it may ensure that the potential of the first node N1 is stable.

In the embodiments of the present disclosure, by arranging the leakage prevention sub-circuit 40 coupled to the data writing sub-circuit 10 in the pixel driving circuit 100, the data writing sub-circuit 10 may store a light-emitting compensation signal V1 in the data writing period, and another light-emitting compensation signal V1 may be written into the leakage prevention sub-circuit 40 in the data writing period, so that the leakage prevention sub-circuit 40 stores the another light-emitting compensation signal V1. In this way, in the light-emitting period, the light-emitting control sub-circuit 20 is turned on in response to the light-emitting control signal provided by the light-emitting control signal terminal EM and the light-emitting compensation signal V1 stored in the data writing sub-circuit 10, so that the light-emitting device L is driven to emit light. Meanwhile, the leakage prevention sub-circuit 40 can inhibit the leakage of the data writing sub-circuit 10 according to the another light-emitting compensation signal V1. For example, the leakage prevention sub-circuit 40 provides the another light-emitting compensation signal V1 stored therein to the data writing sub-circuit 10 continuously to ensure that the light-emitting compensation signal V1 output by the data writing sub-circuit 10 is stable. As a result, the light-emitting device L is ensured to emit light of uniform brightness. That is, a leakage problem of the pixel driving circuit 100 may be effectively ameliorated with an assistance of the leakage prevention sub-circuit 40 in the embodiments of the present disclosure, so that the flickering problem occuring during the display of the display device is avoided, and thus a display effect is improved.

It will be understood that, referring to FIGS. 6A, 6B, 7A, 7B, 8A, 8B, 9A and 9B, in the same data writing sub-circuit 10, control electrodes of the second transistors in the second transistor group are coupled to the same scan signal terminal S1, and the second transistors in the second transistor group are connected in series between the first node N1 and the second electrode of the driving transistor DT.

Optionally, the second transistors in the second transistor group are oxide semiconductor thin film transistors. In this way, by utilizing properties of low leakage of the oxide semiconductor thin film transistors, it may be possible to further enhance a leakage inhibition effect of the leakage prevention sub-circuit 40 on the data writing sub-circuit 10, and thus improve the display effect of the display image.

The number of the second transistors in the second transistor group is two, three, four, etc., which may be set by those skilled in the art according to actual needs.

In some examples, referring to FIGS. 6A, 6B, 10 and 11, the number of the second transistors in the second transistor group is two. That is, the second transistor group includes a first second transistor T21 and a second transistor T21. Control electrodes of the first second transistor T21 and the second transistor T22 are both coupled to the first scan signal terminal S1. A first electrode of the first second transistor T21 is coupled to the first node N1, and a second electrode of the first second transistor T21 is coupled to a first electrode of the second transistor T22. A second electrode of the second transistor T22 is coupled to the second electrode of the driving transistor DT.

For convenience of description, a connection point between the second electrode of the first second transistor T21 and the first electrode of the second transistor T22 is defined as a second node N2. The second electrode of the first storage capacitor C1 is coupled to the second node N2.

In the data writing period, the second storage capacitor C2 and the first storage capacitor C1 are charged to store respective light-emitting compensation signals V1. In the light-emitting period, the second storage capacitor C2 is discharged to control the potential of the first node N1, so as to control the driving transistor DT to be turned on according to the light-emitting compensation signal V1; and the first storage capacitor C1 is discharged to control a potential of the second node N2. Since the light-emitting compensation signals V1 stored in the first storage capacitor C1 and in the second storage capacitor C2 are the same, potentials of the second node N2 and the first node N1 are the same or approximately the same under an action of the first storage capacitor C1 (i.e., the leakage prevention sub-circuit 40), so that leakage of the first second transistor T21 coupled between the second node N2 and the first node N1 may be effectively prevented. As a result, the potential of the first node N1 is ensured to remain stable.

Moreover, even if there is a large voltage difference between the first electrode and the second electrode of the second transistor T22, so that the second transistor T22 leaks current to pull down the potential of the second node N2, the another light-emitting compensation signal V1 stored in the first storage capacitor C1 may also ensure that the potential of the second node N2 drops slowly over a period of time, and thus ensure that the potential of the first node N1 remains stable within the period of time.

Figure 10:
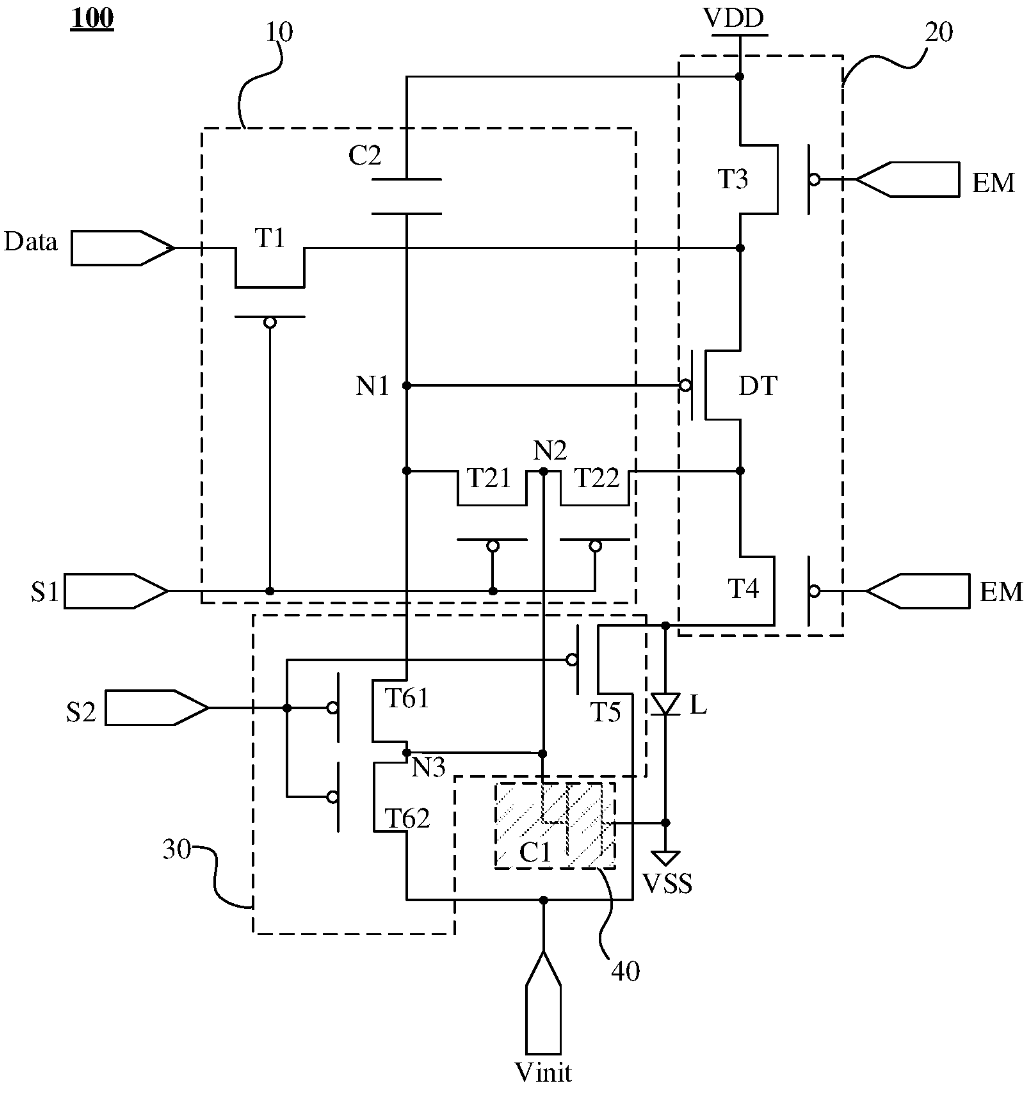
FIG. 10 is a configuration diagram of yet another pixel driving circuit provided in some embodiments of the present disclosure.
Figure 11:
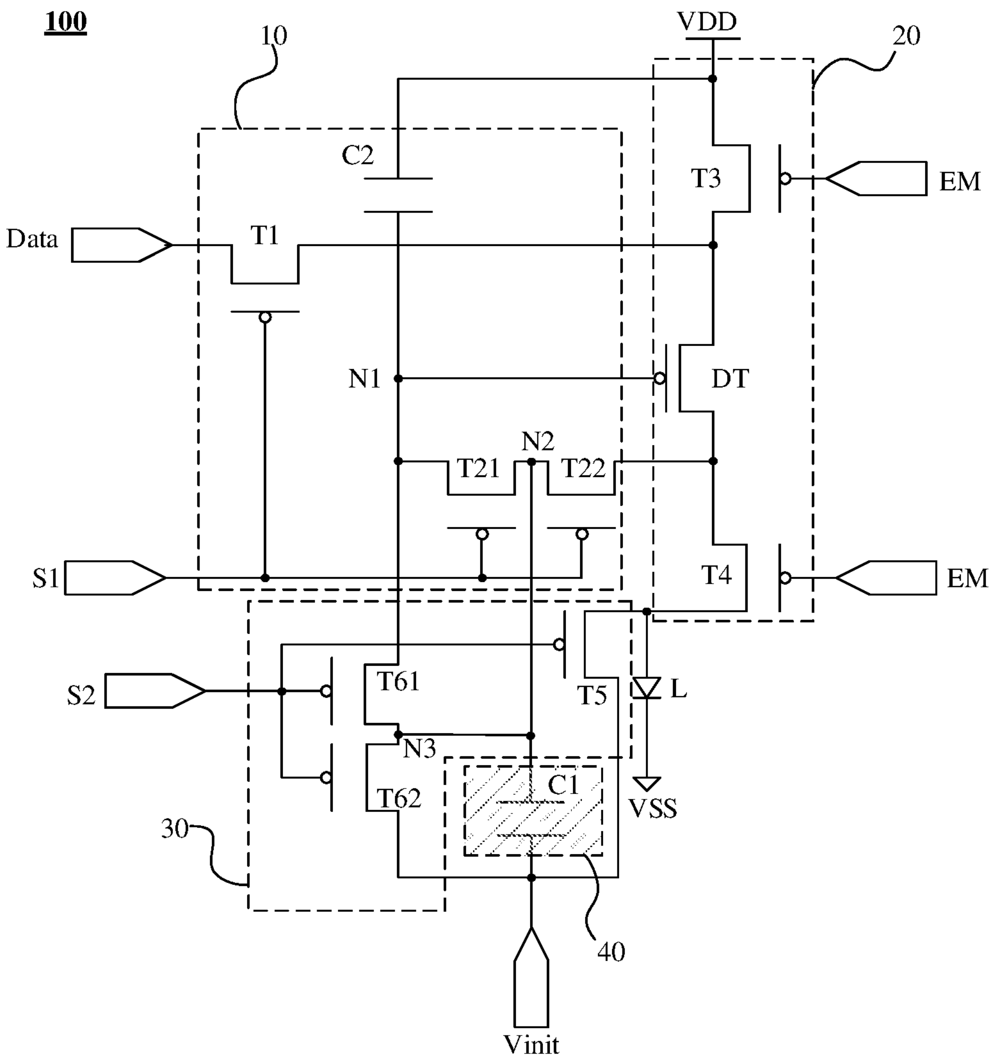
FIG. 11 is a configuration diagram of yet another pixel driving circuit provided in some embodiments of the present disclosure.

In addition, for example, as shown in FIGS. 6A, 6B, 7A, 7B, 8A, 8B, 9A and 9B, the auxiliary voltage terminal V0 and the first power supply voltage terminal VDD are the same voltage terminal. Alternatively, as shown in FIG. 10, the auxiliary voltage terminal V0 and the second power supply voltage terminal VSS are the same voltage terminal. Alternatively, as shown in FIG. 11, the auxiliary voltage terminal V0 and the initial voltage terminal Vinit are the same voltage terminal.

A capacitance value of the first storage capacitor C1 and a capacitance value of the second storage capacitor C2 may be the same or different, and the capacitance values of the two may be set such that the potential of the first node N1 is ensured to be stable.

In some other examples, referring to FIGS. 7A, 7B, 8A, 8B, 9A and 9B, the number of the second transistors in the second transistor group is three. That is, the second transistor group includes a first second transistor T21, a second transistor T22 and a third second transistor T23. Control electrodes of the first second transistor T21, the second transistor T22 and the third second transistor T23 are all coupled to the first scan signal terminal S1. A first electrode of the first second transistor T21 is coupled to the first node N1, and a second electrode of the first second transistor T21 is coupled to a first electrode of the second transistor T22. A second electrode of the second transistor T22 is coupled to a first electrode of the third second transistor T23. A second electrode of the third second transistor T23 is coupled to the second electrode of the driving transistor DT.

For convenience of description, a connection point between the second electrode of the first second transistor T21 and the first electrode of the second transistor T22 is defined as a second node N2. A connection point between the second electrode of the second transistor T22 and the first electrode of the third second transistor T23 is defined as a fourth node N4.

Figure 7A:
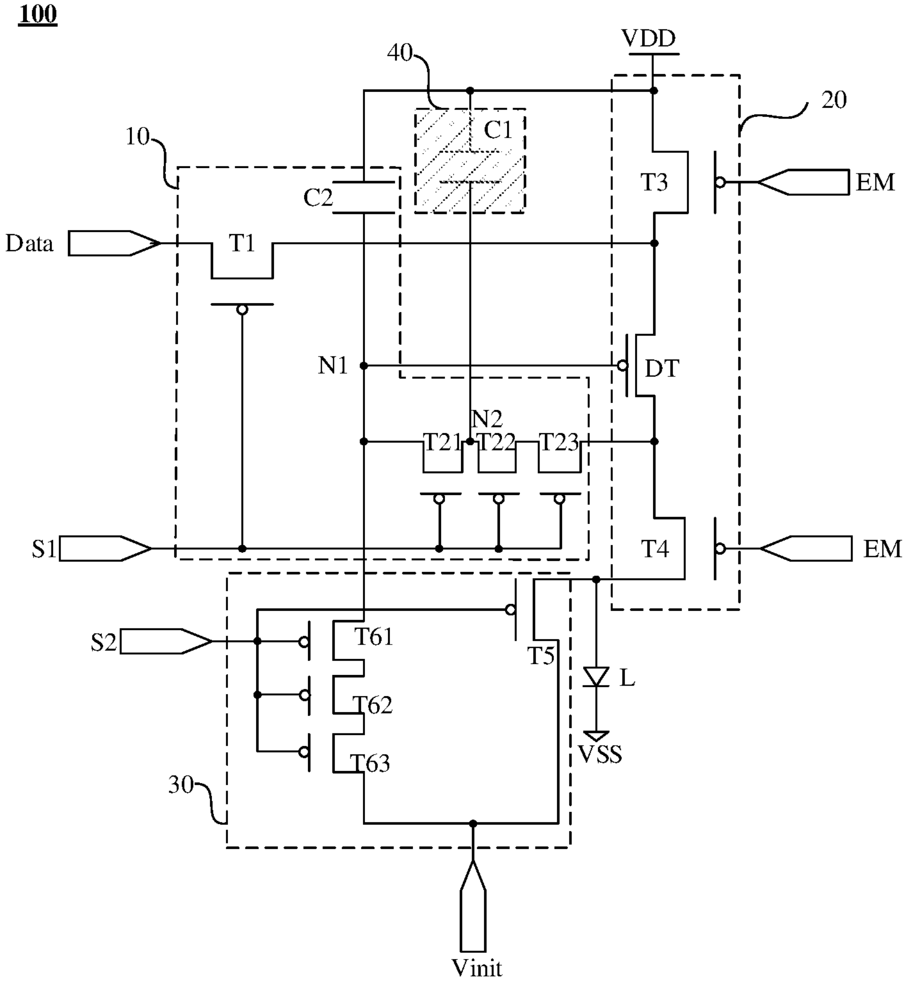
FIG. 7A is a configuration diagram of yet another pixel driving circuit provided in some embodiments of the present disclosure.
Figure 7B:
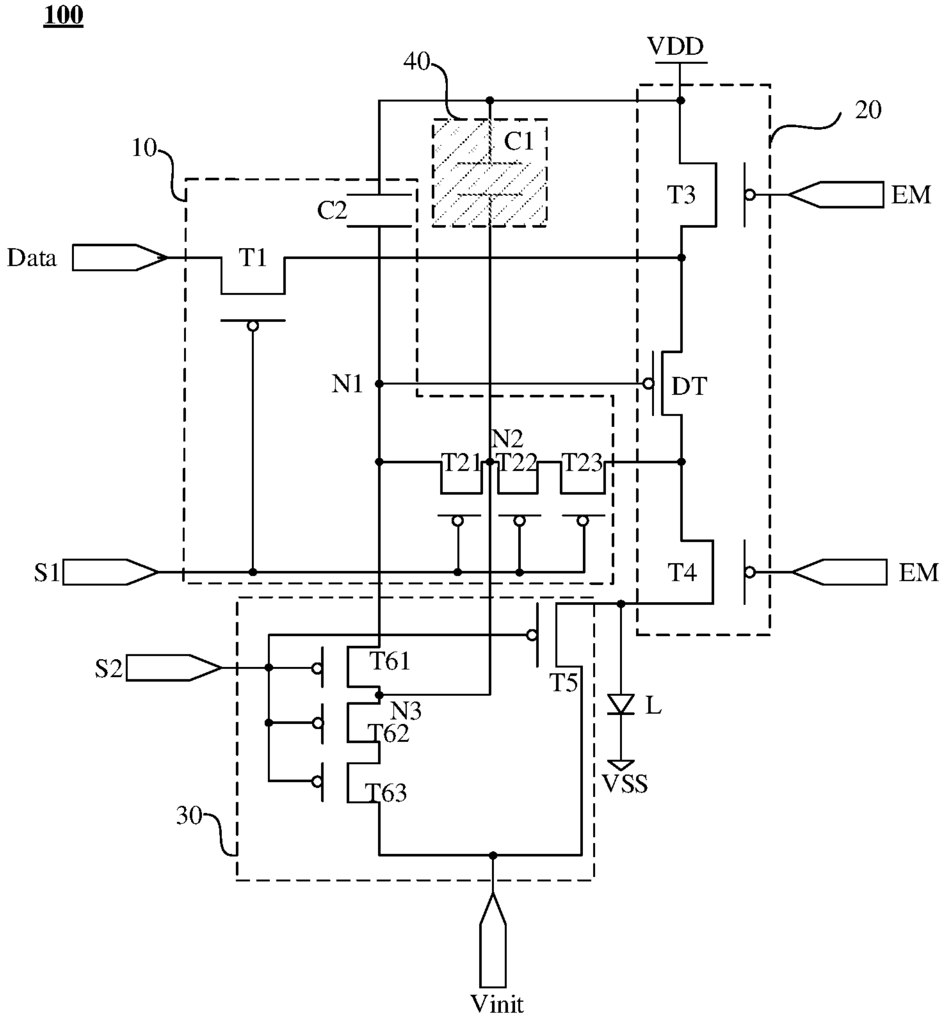
FIG. 7B is a configuration diagram of yet another pixel driving circuit provided in some embodiments of the present disclosure.

Optionally, as shown in FIGS. 7A and 7B, the leakage prevention sub-circuit 40 includes one first storage capacitor C1, and the second electrode of the first storage capacitor C1 is coupled to the second electrode of the first second transistor T21, i.e., the second node N2. In this way, in the data writing period, the second storage capacitor C2 and the first storage capacitor C1 are charged to store respective light-emitting compensation signals V1. In the light-emitting period, the second storage capacitor C2 is discharged to control the potential of the first node N1, so as to control the driving transistor DT to be turned on according to the light-emitting compensation signal V1; and the first storage capacitor C1 is discharged to control the potential of the second node N2. Since the light-emitting compensation signals V1 stored in the first storage capacitor C1 and in the second storage capacitor C2 are the same, the potential of the second node N2 is the same or approximately the same as the potential of the first node N1 under the action of the first storage capacitor C1 (i.e., the leakage prevention sub-circuit 40), so that leakage of the first second transistor T21 coupled between the second node N2 and the first node N1 may be effectively prevented. As a result, the potential of the first node N1 is ensured to remain stable.

Moreover, even if there is a large voltage difference between the first electrode of the second transistor T22 and the second electrode of the third second transistor T23, so that the second transistor T22 and the third second transistor T23 leak current to pull down the potential of the second node N2, the another light-emitting compensation signal V1 stored in the first storage capacitor C1 may also ensure that the potential of the second node N2 drops slowly over a period of time, and thus ensure that the potential of the first node N1 remains stable within the period of time.

Figure 8A:
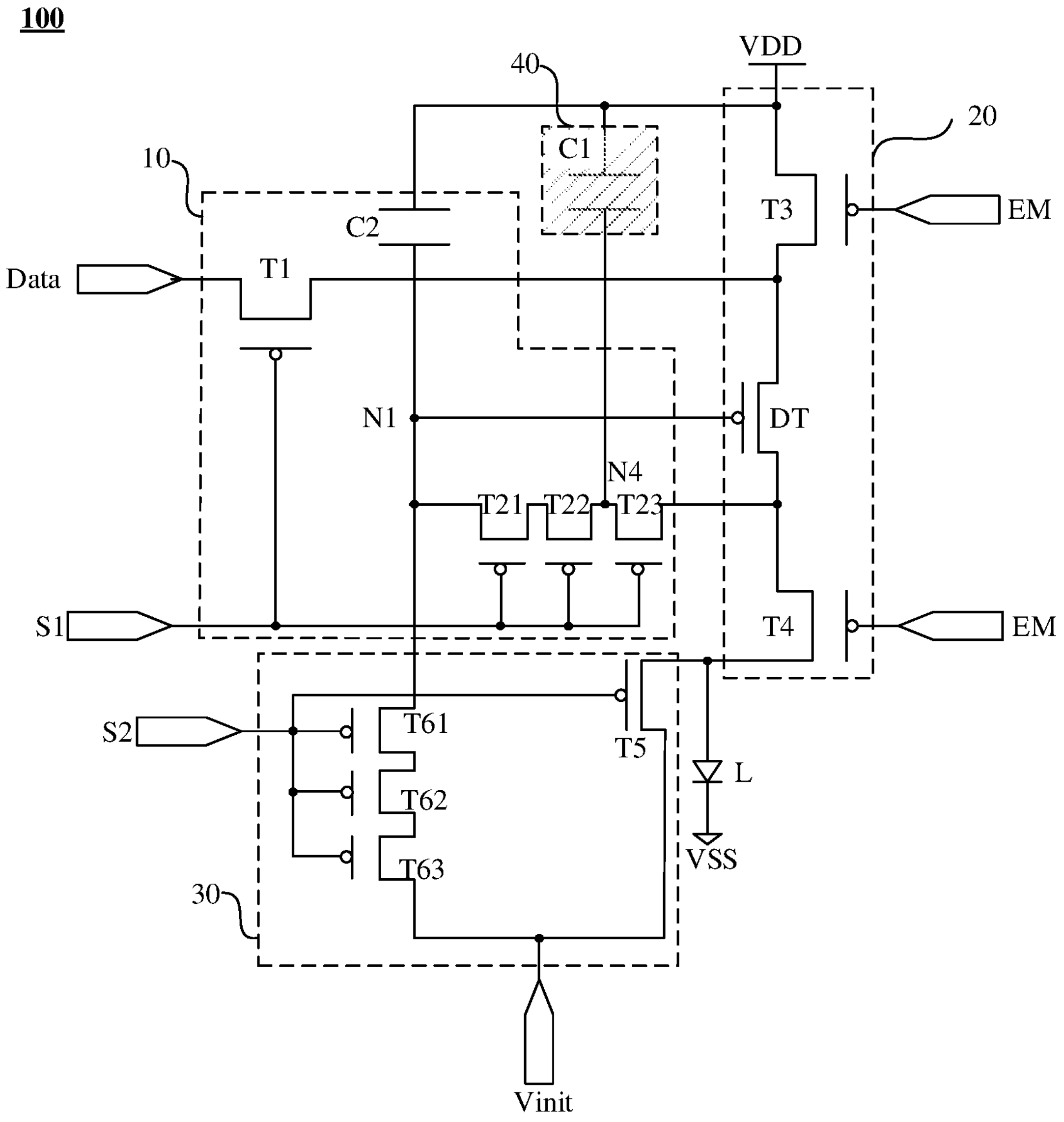
FIG. 8A is a configuration diagram of yet another pixel driving circuit provided in some embodiments of the present disclosure.
Figure 8B:
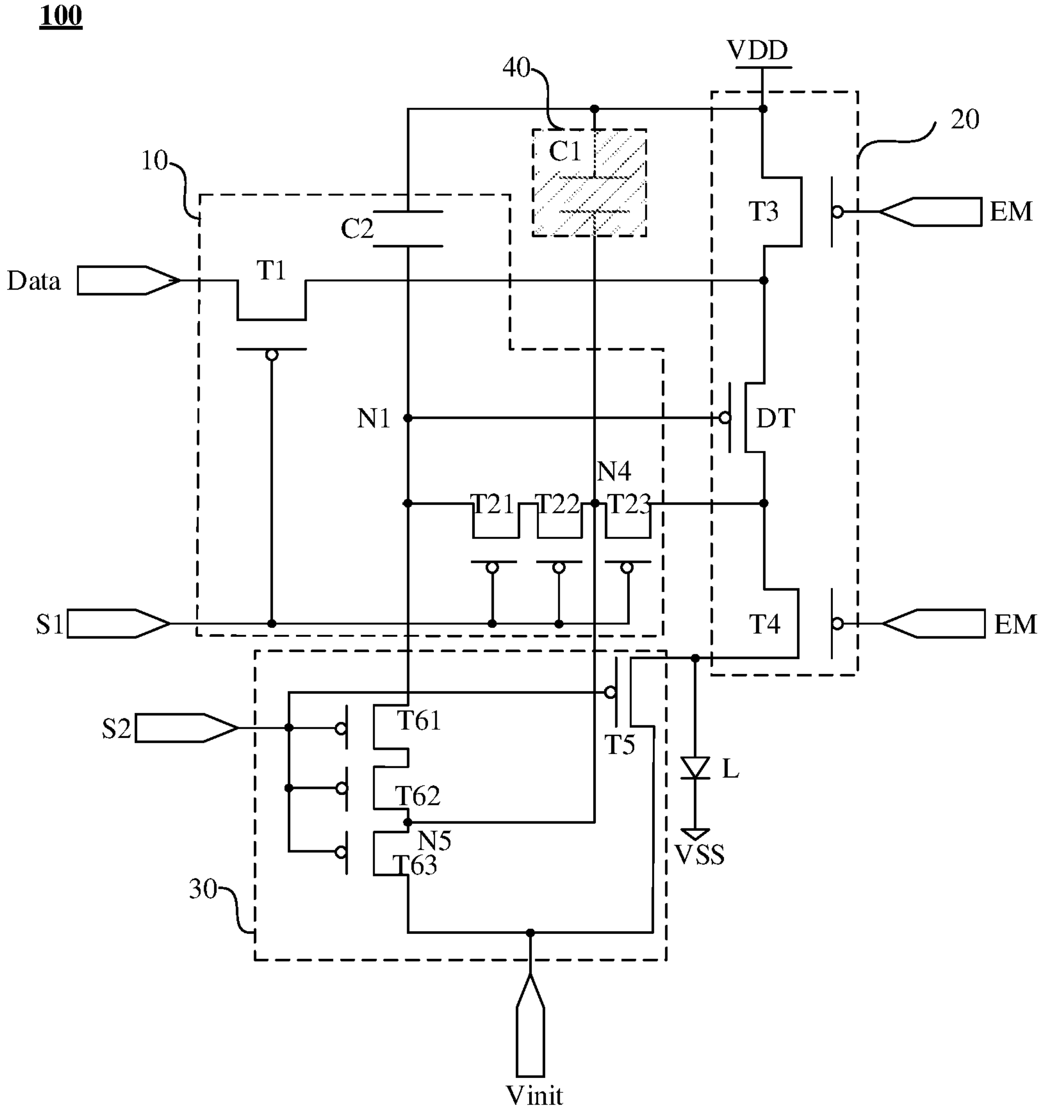
FIG. 8B is a configuration diagram of yet another pixel driving circuit provided in some embodiments of the present disclosure.

Optionally, as shown in FIGS. 8A and 8B, the leakage prevention sub-circuit 40 includes one first storage capacitor C1, and the second electrode of the first storage capacitor C1 is coupled to the second electrode of the second transistor T22, i.e., the fourth node N4. In this way, in the data writing period, the second storage capacitor C2 and the first storage capacitor C1 are charged to store respective light-emitting compensation signals V1. In the light-emitting period, the second storage capacitor C2 is discharged to control the potential of the first node N1, so as to control the driving transistor DT to be turned on according to the light-emitting compensation signal V1; and the first storage capacitor C1 is discharged to control a potential of the fourth node N4. Since the light-emitting compensation signals V1 stored in the first storage capacitor C1 and in the second storage capacitor C2 are the same, a potential of the fourth node N4 is the same or approximately the same as the potential of the first node N1 under the action of the first storage capacitor C1 (i.e., the leakage prevention sub-circuit 40), so that leakage of the first second transistor T21 and the second transistor T22 that are coupled between the fourth node N4 and the first node N1 may be effectively prevented. As a result, the potential of the first node N1 is ensured to remain stable.

Moreover, even if there is a large voltage difference between the first electrode and the second electrode of the third second transistor T23, so that the third second transistor T23 leaks current to pull down the potential of the fourth node N4, the another light-emitting compensation signal V1 stored in the first storage capacitor C1 may also ensure that the potential of the fourth node N4 drops slowly over a period of time, and thus ensure that the potential of the first node N1 remains stable within the period of time.

Figure 9A:
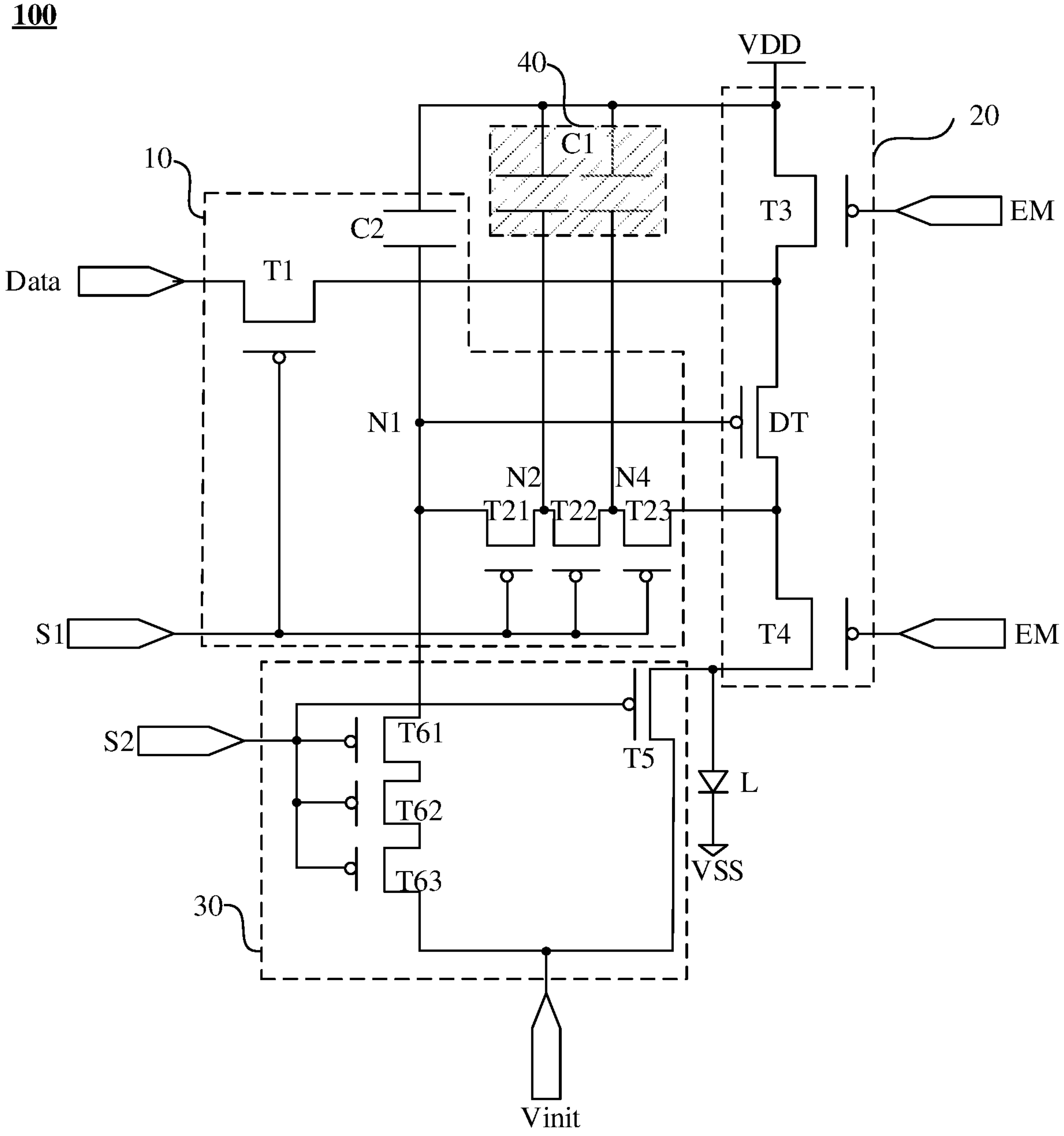
FIG. 9A is a structural diagram of yet another pixel driving circuit provided in some embodiments of the present disclosure.
Figure 9B:
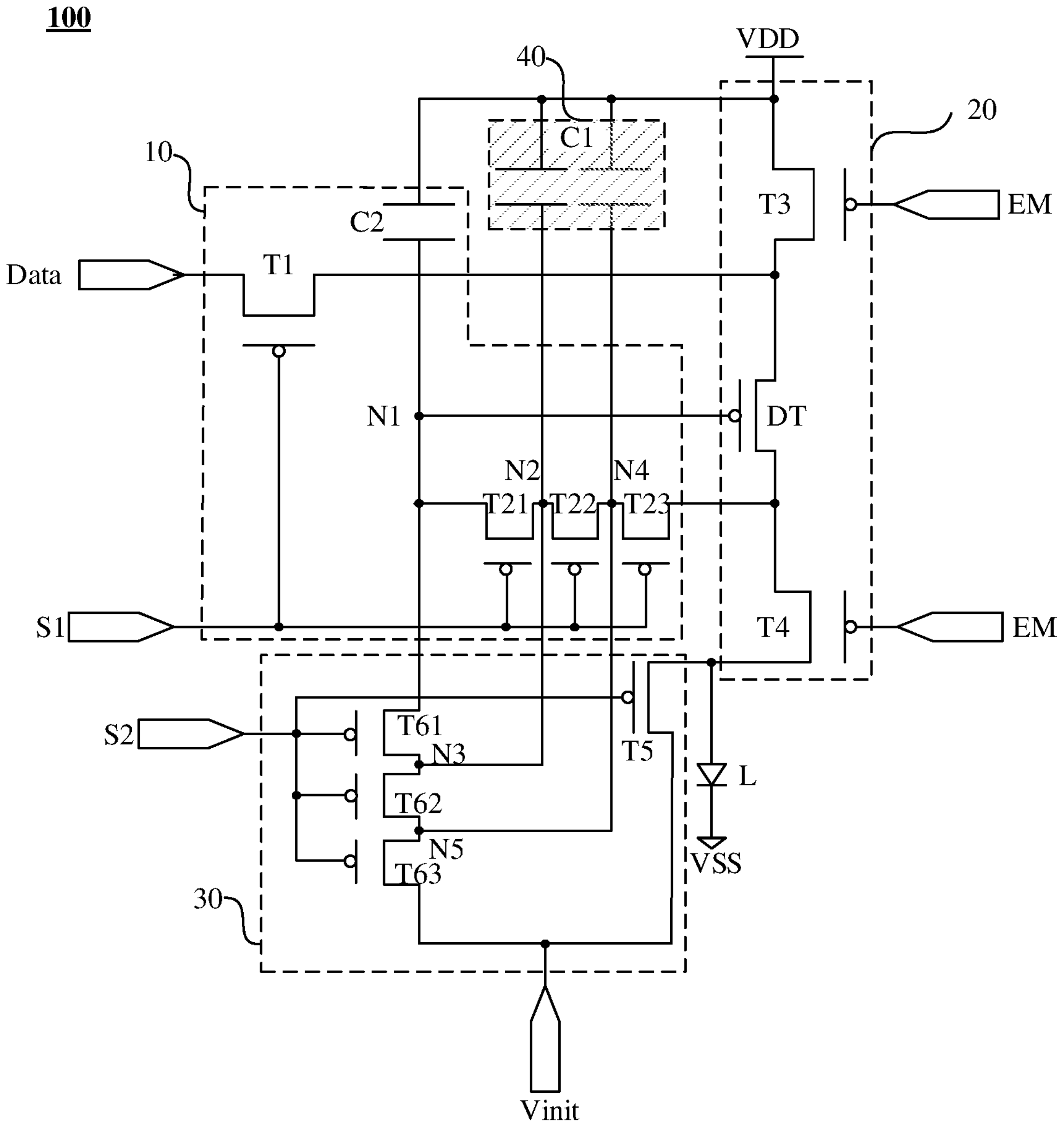
FIG. 9B is a configuration diagram of yet another pixel driving circuit provided in some embodiments of the present disclosure.

Optionally, as shown in FIGS. 9A and 9B, the leakage prevention sub-circuit 40 includes two first storage capacitors C1. A second electrode of a first storage capacitor C1 is coupled to the second node N2, and a second electrode of another first storage capacitor C1 is coupled to the fourth node N4.

In this way, in the data writing period, the second storage capacitor C2 and the two first storage capacitors C1 are charged to store respective light-emitting compensation signals V1. In the light-emitting period, the second storage capacitor C2 is discharged to control the potential of the first node N1, so as to control the driving transistor DT to be turned on according to the light-emitting compensation signal V1; and the first storage capacitor C1 is discharged to control the potential of the second node N2, and the another first storage capacitor C1 is discharged to control the potential of the fourth node N4. Since the light-emitting compensation signals V1 stored in the two first storage capacitors C1 and in the second storage capacitor C2 are the same, potentials of the second node N2 and the fourth node N4 are the same or approximately the same as the potential of the first node N1 under an action of the two first storage capacitors C1 (i.e., the leakage prevention sub-circuit 40), so that leakage of the first second transistor T21 coupled between the second node N2 and the first node N1 and leakage of the second transistor T22 coupled between the second node N2 and the fourth node N4 may be effectively prevented. As a result, the potential of the first node N1 is ensured to remain stable.

Moreover, even if there is a large voltage difference between the first electrode and the second electrode of the third second transistor T23, so that the third second transistor T23 leaks current to pull down the potential of the fourth node N4, the light-emitting compensation signals V1 stored in the two first storage capacitors C1 may also ensure that potentials of the second node N2 and the fourth node N4 drop slowly over a period of time, and thus ensure that the potential of the first node N1 remains stable within the period of time.

In conclusion, the light-emitting compensation signals V1 stored in the first storage capacitors C1 may ensure that the potential of the second node N2 is stable, and/or that the potential of the fourth node N4 is stable. In addition, in the light-emitting period, the second transistors in the second transistor group are all in an off state. As a result, the potential of the first node N1 is not likely to be pulled down due to a leakage current generated in a certain second transistor. In this way, it may be possible to make a voltage of the first node N1 that controls the driving transistor DT to be turned on be stable, so as to ensure that light emitted by the light-emitting device L has uniform brightness, and further improve the flickering problem of the display.

In some embodiments of the present disclosure, the capacitors may be capacitor devices that are fabricated separately through processes. For example, special capacitor electrodes are fabricated to form the capacitor device. For example, the electrodes of the capacitor may each be fabricated through a metal layer, a semiconductor layer (e.g., doped polysilicon), or the like. The capacitor may also be a parasitic capacitor formed by transistors, or be achieved by a transistor itself and another device or line, or by a parasitic capacitor formed by lines of a circuit itself. Optionally, the capacitance values of the first storage capacitor C1 and the second storage capacitor C2 may be the same or different.

Figure 5:
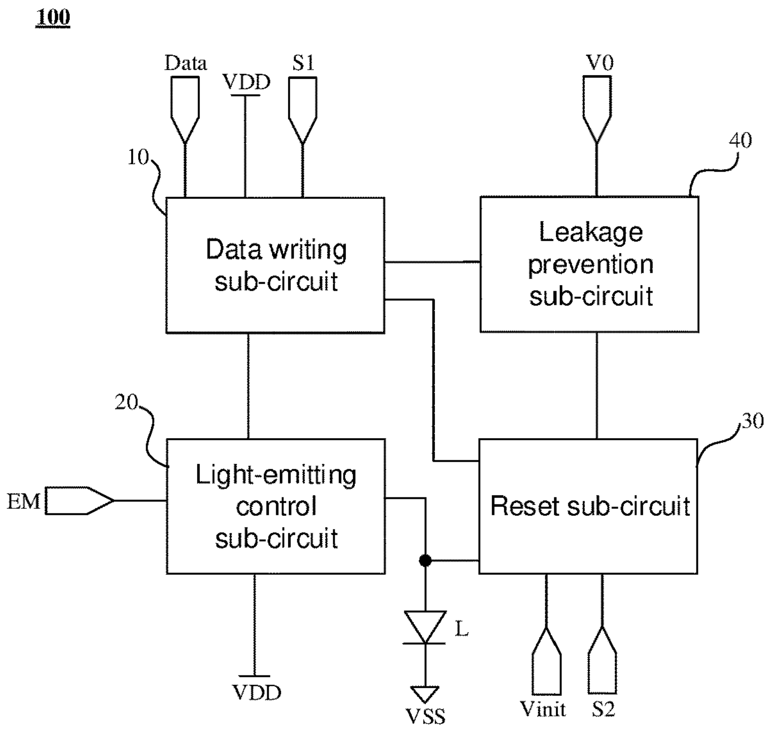
FIG. 5 is a structural diagram of yet another pixel driving circuit provided in some embodiments of the present disclosure.

In some embodiments, referring to FIG. 5, the pixel driving circuit 100 further includes a reset sub-circuit 30. The reset sub-circuit 30 is coupled to a second scan signal terminal S2, the initial voltage terminal Vinit, the data writing sub-circuit 10, the leakage prevention sub-circuit 40 and the light-emitting device L. The reset sub-circuit 30 is configured to: in a reset period, transmit an initial voltage signal from the initial voltage terminal Vinit to the data writing sub-circuit 10, the leakage prevention sub-circuit 40 and the light-emitting device L in response to a reset scan signal from the second scan signal terminal S2 to reset the data writing sub-circuit 10, the leakage prevention sub-circuit 40 and the light-emitting device L.

The leakage prevention sub-circuit 40 is further configured to: in the light-emitting period, inhibit leakage of the reset sub-circuit 30 according to the another light-emitting compensation signal V1. In this way, in the embodiments of the present disclosure, the leakage of the reset sub-circuit 30 may be inhibited while the leakage of the data writing sub-circuit 10 is inhibited.

For example, referring FIGS. 6B, 7B, 8B, 9B, 10 and 11, the second electrode of the first storage capacitor C1 in the leakage prevention sub-circuit 40 is further coupled to the reset sub-circuit 30. The first storage capacitor C1 is further configured to be discharged in the light-emitting period to continuously provide the another light-emitting compensation signal V1 to the reset sub-circuit 30.

Optionally, referring to FIGS. 6B, 7B, 8B, 9B, 10 and 11, the reset sub-circuit 30 includes a fifth transistor T5 and a sixth transistor group. The sixth transistor group includes at least two sixth transistors that are connected in series. A control electrode of the fifth transistor T5 is coupled to the second scan signal terminal S2, a first electrode of the fifth transistor T5 is coupled to the initial voltage terminal Vinit, and a second electrode of the fifth transistor T5 is coupled to the anode of the light-emitting device L. Control electrodes of the sixth transistors in the sixth transistor group are coupled to the second scan signal terminal S2. A first electrode of a first sixth transistor in the sixth transistor group is connected to the first node N1 in the data writing sub-circuit 10, and a second electrode of a last sixth transistor in the sixth transistor group is coupled to the initial voltage terminal Vinit.

The second electrode of the first storage capacitor C1 is coupled to the reset sub-circuit 30, which may mean that, the second electrode of the first storage capacitor C1 is coupled to a connection line between any two adjacent sixth transistors in the sixth transistor group.

In this way, in the light-emitting period, potentials of a second electrode and a first electrode of a sixth transistor coupled to the first storage capacitor C1 in the sixth transistor group are the same or approximately the same due to the another light-emitting compensation signal stored in the first storage capacitor C1, which prevents leakage of the sixth transistor coupled to the first node N1, and may thus inhibit the leakage of the reset sub-circuit 30. As a result, it may further ensure that the potential of the first node N1 is stable.

In the embodiments of the present disclosure, the leakage prevention sub-circuit 40 is coupled to the reset sub-circuit 30, and may continuously provide the another light-emitting compensation signal V1 stored in the first storage capacitor C1 to the reset sub-circuit 30 during the light-emitting period. That is, the leakage prevention sub-circuit 40 is used to inhibit the leakage of the reset sub-circuit 30, and thus the potential of the first node N1 is further ensured to be stable. As a result, the light-emitting device L is ensured to emit light of uniform brightness. In the embodiments of the present disclosure, the leakage problem of the pixel driving circuit 100 may be effectively ameliorated with the assistance of the leakage prevention sub-circuit 40, so that the flickering problem of the display is solved, and thus the display effect is improved.

It will be understood that, in the same reset sub-circuit 30, the control electrodes of the sixth transistors in the sixth transistor group are coupled to the same scan signal terminal, and the sixth transistors in the sixth transistor group are connected in series between the first node N1 and the initial voltage terminal Vinit.

Optionally, the sixth transistors in the sixth transistor group are oxide semiconductor thin film transistors. In this way, by utilizing properties of low leakage of the oxide semiconductor thin film transistors, it may be possible to further enhance a leakage inhibition effect of the leakage prevention sub-circuit 40 on the reset sub-circuit 30, and thus improve the display effect of the display image.

The number of the sixth transistors in the sixth transistor group is two, three, four, etc., which may be set by those skilled in the art according to actual needs.

In some examples, referring to FIGS. 6A, 6B, 10 and 11, the leakage prevention sub-circuit 40 includes one first storage capacitor C1, and the number of the sixth transistors in the sixth transistor group is two (that is, the sixth transistor group includes a first sixth transistor T61 and a second sixth transistor T62). Control electrodes of the first sixth transistor T61 and the second sixth transistor T62 are coupled to the second scan signal terminal S2. A first electrode of the first sixth transistor T61 is coupled to the first node N1, and a second electrode of the first sixth transistor T61 is coupled to a first electrode of the second sixth transistor T62. A second electrode of the second sixth transistor T62 is coupled to the initial voltage terminal Vinit.

For convenience of description, referring to FIGS. 6B, 10 and 11, a connection point between the second electrode of the first sixth transistor T61 and the first electrode of the second sixth transistor T62 is defined as a third node N3 below. The second electrode of the first storage capacitor C1 is coupled to the third node N3.

In the reset period, the reset sub-circuit 30 transmits the initial voltage signal output by the initial voltage terminal Vinit to the first storage capacitor C1, the second storage capacitor C2 and the light-emitting device L, so that the leakage prevention sub-circuit 40, the data writing sub-circuit 10 and the light-emitting device L may be reset. In the data writing period, the second storage capacitor C2 and the first storage capacitor C1 are charged to store respective light-emitting compensation signals V1. In the light-emitting period, the second storage capacitor C2 is discharged to control the potential of the first node N1, so as to control the driving transistor DT to be turned on according to the light-emitting compensation signal V1; and the first storage capacitor C1 is discharged to control a potential of the third node N3. Since the light-emitting compensation signals V1 stored in the first storage capacitor C1 and in the second storage capacitor C2 are the same, potentials of the second node N2 and the third node N3 are the same or approximately the same as the potential of the first node N1 under the action of the first storage capacitor C1 (i.e., the leakage prevention sub-circuit 40), so that leakage of the first second transistor T21 coupled between the second node N2 and the first node N1 and leakage of the first sixth transistor T61 coupled between the third node N3 and the first node N1 may be effectively prevented. As a result, the potential of the first node N1 is ensured to remain stable.

Moreover, even if there is a large voltage difference between the first electrode and the second electrode of the second sixth transistor T62, so that the second sixth transistor T62 leaks current to pull down the potential of the third node N3, the another light-emitting compensation signal V1 stored in the first storage capacitor C1 may also ensure that the potential of the third node N3 drops slowly over a period of time, and thus ensure that the potential of the first node N1 remains stable within the period of time.

In some other examples, referring to FIGS. 7B, 8B and 9B, the number of the sixth transistors in the sixth transistor group is three. That is, the sixth transistor group includes a first sixth transistor T61, a second sixth transistor T62 and a third sixth transistor T63. Control electrodes of the first sixth transistor T61, the second sixth transistor T62 and the third sixth transistor T63 are all coupled to the second scan signal terminal S2. A first electrode of the first sixth transistor T61 is coupled to the first node N1, and a second electrode of the first sixth transistor T61 is coupled to a first electrode of the second sixth transistor T62. A second electrode of the second sixth transistor T62 is coupled to a first electrode of the third sixth transistor T63. A second electrode of the third sixth transistor T63 is coupled to the initial voltage terminal Vinit.

For convenience of description, a connection point between the second electrode of the first sixth transistor T61 and the first electrode of the second sixth transistor T62 is defined as the third node N3 below. A connection point between the second electrode of the second sixth transistor T62 and the first electrode of the third sixth transistor T63 is defined as a fifth node N5.

Optionally, as shown in FIG. 7B, the leakage prevention sub-circuit 40 includes one first storage capacitor C1, and the second electrode of the first storage capacitor C1 is coupled to the second node N2 and the third node N3. In this way, in the data writing period, the second storage capacitor C2 and the first storage capacitor C1 are charged to store respective light-emitting compensation signals V1. In the light-emitting period, the second storage capacitor C2 is discharged to control the potential of the first node N1, so as to control the driving transistor DT to be turned on according to the light-emitting compensation signal V1; and the first storage capacitor C1 is discharged to control the potentials of the second node N2 and the third node N3. Since the light-emitting compensation signals V1 stored in the first storage capacitor C1 and in the second storage capacitor C2 are the same, the potentials of the second node N2 and the third node N3 are the same or approximately the same as the potential of the first node N1 under the action of the first storage capacitor C1 (i.e., the leakage prevention sub-circuit 40), so that leakage of the first second transistor T21 coupled between the second node N2 and the first node N1 and leakage of the first sixth transistor T61 coupled between the third node N3 and the first node N1 may be effectively prevented. As a result, the potential of the first node N1 is ensured to remain stable.

Moreover, even if there is a large voltage difference between the first electrode of the second sixth transistor T62 and the second electrode of the third sixth transistor T63, so that the second sixth transistor T62 and the third sixth transistor T63 leak current to pull down the potential of the third node N3, the another light-emitting compensation signal V1 stored in the first storage capacitor C1 may also ensure that the potential of the third node N3 drops slowly over a period of time, and thus ensure that the potential of the first node N1 remains stable within the period of time.

Optionally, as shown in FIG. 8B, the leakage prevention sub-circuit 40 includes one first storage capacitor C1, and the second electrode of the first storage capacitor C1 is coupled to the fourth node N4 and the fifth node N5. In this way, in the data writing period, the second storage capacitor C2 and the first storage capacitor C1 are charged to store respective light-emitting compensation signals V1. In the light-emitting period, the second storage capacitor C2 is discharged to control the potential of the first node N1, so as to control the driving transistor DT to be turned on according to the light-emitting compensation signal V1; and the first storage capacitor C1 is discharged to control potentials of the fourth node N4 and the fifth node N5. Since the light-emitting compensation signals V1 stored in the first storage capacitor C1 and in the second storage capacitor C2 are the same, potentials of the fourth node N4 and the fifth node N5 are the same or approximately the same as the potential of the first node N1 under the action of the first storage capacitor C1 (i.e., the leakage prevention sub-circuit 40), so that leakage of the first second transistor T21 and the second transistor T22 that are coupled between the fourth node N4 and the first node N1 and leakage of the first sixth transistor T61 and the second sixth transistor T62 that are coupled between the fifth node N5 and the first node N1 may be effectively prevented. As a result, the potential of the first node N1 is ensured to remain stable.

Moreover, even if there is a large voltage difference between the first electrode and the second electrode of the third sixth transistor T63, so that the third sixth transistor T63 leaks current to pull down a potential of the fifth node N5, the another light-emitting compensation signal V1 stored in the first storage capacitor C1 may also ensure that the potential of the fifth node N5 drops slowly over a period of time, and thus ensure that the potential of the first node N1 remains stable within the period of time.

Optionally, as shown in FIG. 9B, the leakage prevention sub-circuit 40 includes two first storage capacitors C1. A second electrode of a first storage capacitor C1 is coupled to the second node N2 and the third node N3, and a second electrode of another first storage capacitor C1 is coupled to the fourth node N4 and the fifth node N5. In this way, in the data writing period, the second storage capacitor C2 and the first storage capacitors C1 are charged to store respective light-emitting compensation signals V1. In the light-emitting period, the second storage capacitor C2 is discharged to control the potential of the first node N1, so as to control the driving transistor DT to be turned on according to the light-emitting compensation signal V1. In addition, the first storage capacitor C1 is discharged to control the potentials of the second node N2 and the third node N3, and the another first storage capacitor C1 is discharged to control the potentials of the fourth node N4 and the fifth node N5. Since the light-emitting compensation signals V1 stored in the two first storage capacitors C1 and in the second storage capacitor C2 are the same, potentials of the second node N2, the third node N3, the fourth node N4 and the fifth node N5 are the same or approximately the same as the potential of the first node N1 under the action of the two first storage capacitors C1 (i.e., the leakage prevention sub-circuit 40), so that leakage of the first second transistor T21 coupled between the second node N2 and the first node N1, leakage of the second transistor T22 coupled between the second node N2 and the fourth node N4, leakage of the first sixth transistor T61 coupled between the third node N3 and the first node N1 and leakage of the second sixth transistor T62 coupled between the third node N3 and the fifth node N5 may be effectively prevented. As a result, the potential of the first node N1 is ensured to remain stable.

Moreover, even if there is a large voltage difference between the first electrode and the second electrode of the third sixth transistor T63, so that the third sixth transistor T63 leaks current to pull down the potential of the fifth node N5, the light-emitting compensation signals V1 stored in the two first storage capacitors C1 may also ensure that potentials of the fifth node N5 and the third node N3 drop slowly over a period of time, and thus ensure that the potential of the first node N1 remains stable within the period of time.

In conclusion, the light-emitting compensation signals V1 stored in the first storage capacitors C1 may ensure that the potential of the third node N3 is stable, and/or that the potential of the fifth node N5 is stable. In addition, in the light-emitting period, the sixth transistors in the sixth transistor group are all in an off state. As a result, the potential of the first node N1 is not likely to be pulled down due to a leakage current generated in a certain sixth transistor. In this way, it may be possible to make a voltage of the first node N1 that controls the driving transistor DT to be turned on be stable, so as to ensure that light emitted by the light-emitting device L has uniform brightness, and further improve the flickering problem of the display.

In the pixel driving circuit 100 provided in some embodiments of the present disclosure, the first node N1, the second node N2, the third node N3, the fourth node N4 and the fifth node N5 each do not represent an actual component, but a junction of relevant electrical connections in the circuit diagram. That is, these nodes are nodes equivalent to the junctions of the relevant electrical connections in the circuit diagram.

In some embodiments of the present disclosure, specific implementations of the reset sub-circuit 30, the data writing circuit 10, and the light-emitting control sub-circuit 20 are not limited to the manners described above, and may be any implementation manner, such as conventional connection manners well known to those skilled in the art, as long as corresponding functions are ensured to be realized. The above examples are not intended to limit the protection scope of the present disclosure. In practical applications, those skilled in the art may choose to use or not to use one or more of the above circuits according to situations. Various combinations and variations based on the above circuits, which are not described in details here, do not depart from the principle of the present disclosure.

In addition, it will be noted that the leakage prevention sub-circuit 40 provided in embodiments of the present disclosure may inhibit the leakage of the data writing sub-circuit 10 alone, or inhibit leakage of both the data writing sub-circuit 10 and the reset sub-circuit 30, or inhibit the leakage of the reset sub-circuit 30 alone.

Figure 12:
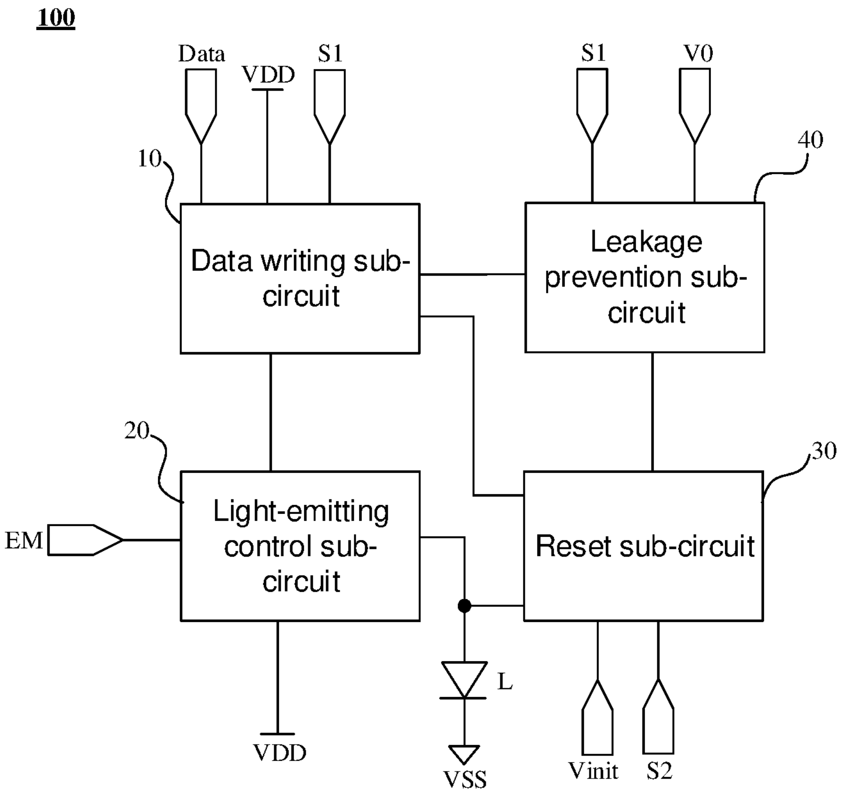
FIG. 12 is a structural diagram of yet another pixel driving circuit provided in some embodiments of the present disclosure.
Figure 13A:
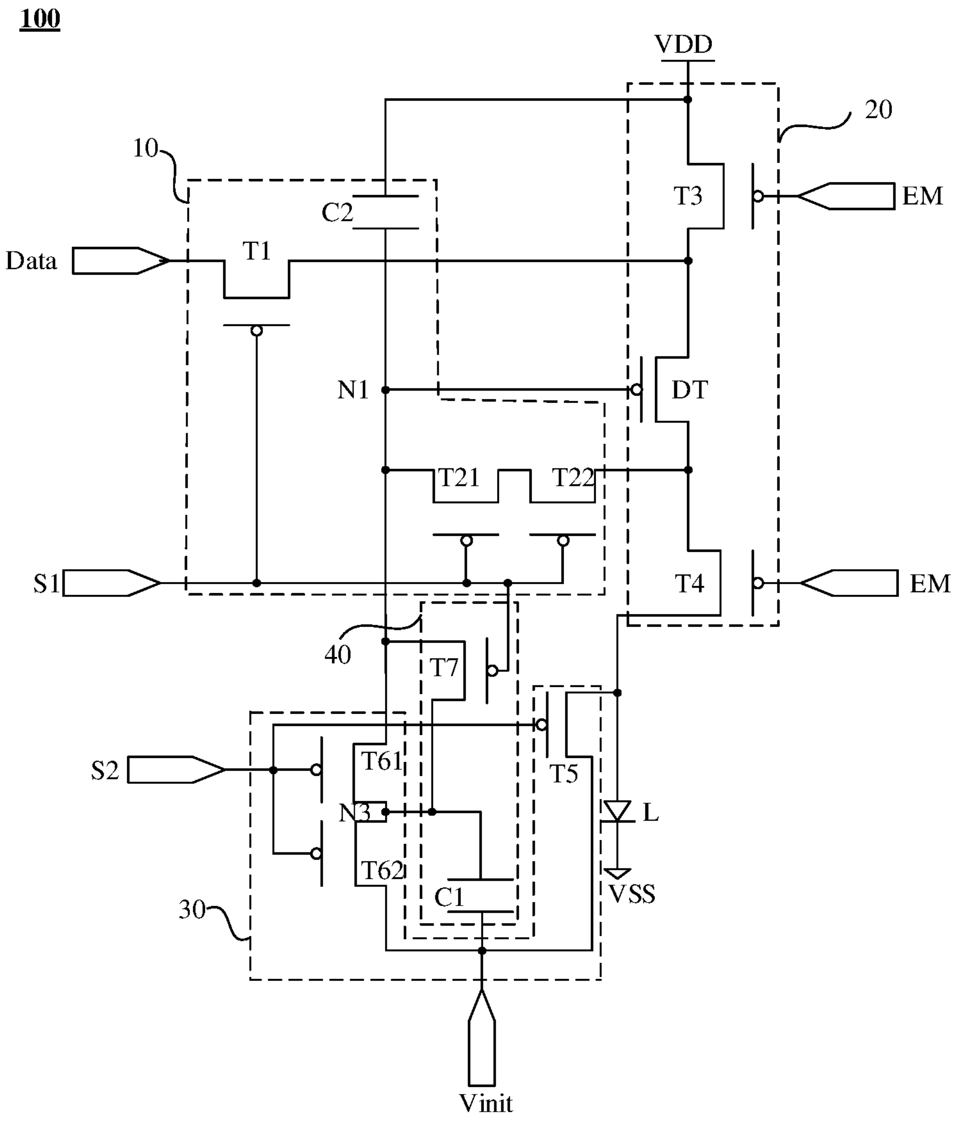
FIG. 13A is a configuration diagram of yet another pixel driving circuit provided in some embodiments of the present disclosure.
Figure 13B:
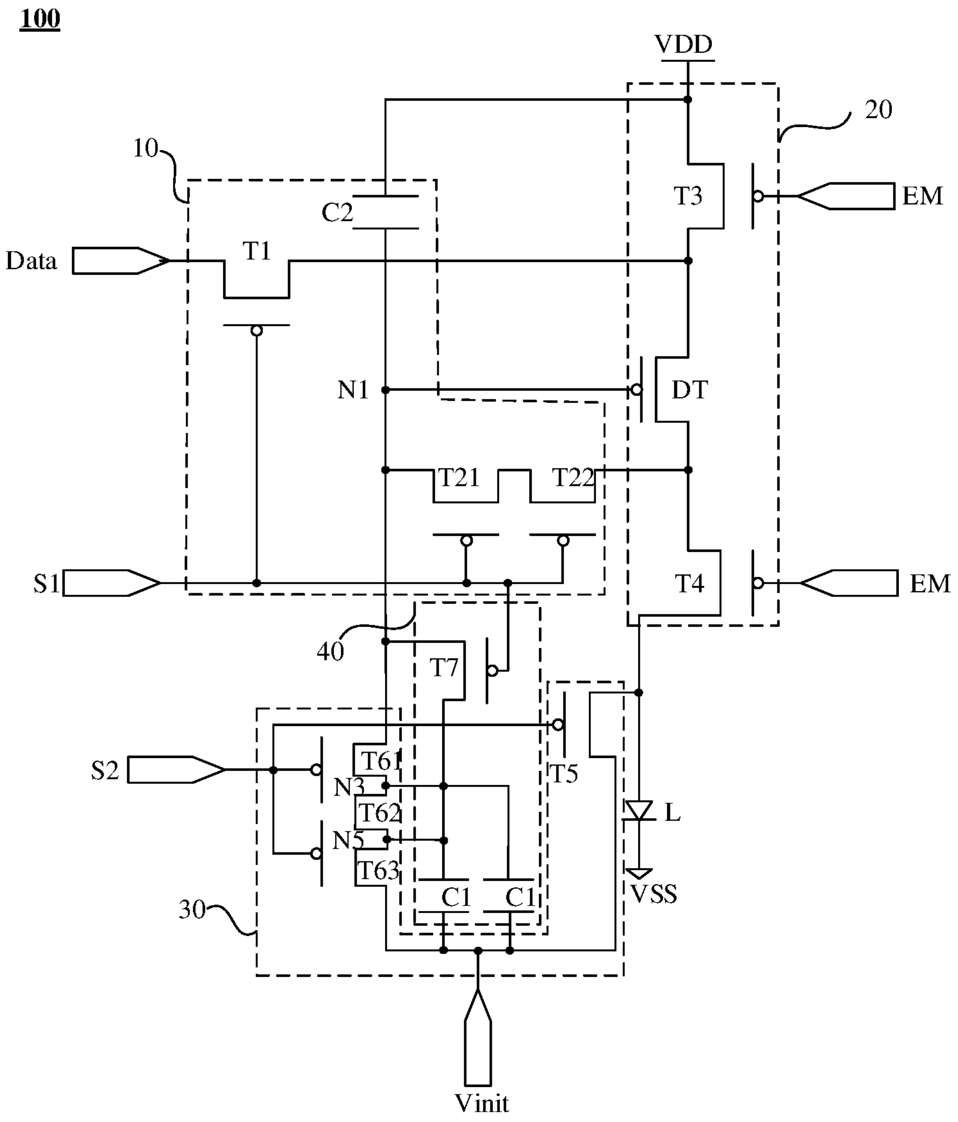
FIG. 13B is a configuration diagram of yet another pixel driving circuit provided in some embodiments of the present disclosure.

Referring to FIGS. 12, 13A and 13B, a pixel driving circuit 100 provided in some embodiments of the present disclosure includes a data writing sub-circuit 10, a reset sub-circuit 30 and a leakage prevention sub-circuit 40.

The data writing sub-circuit 10 is coupled to a first scan signal terminal S1, a data signal terminal Data and a light-emitting control sub-circuit 20. The data writing sub-circuit 10 is configured to: in a data writing period, store a light-emitting compensation signal V1 in response to a gate scan signal from the first scan signal terminal S1 and a data signal $V_{data}$ from the data signal terminal Data; and in a light-emitting period, assist in controlling the light-emitting control sub-circuit 20 to be turned on according to the light-emitting compensation signal V1.

The reset sub-circuit 30 is coupled to a second scan signal terminal S2, an initial voltage terminal Vinit, the leakage prevention sub-circuit 40, the data writing sub-circuit 10 and a light-emitting device L. The reset sub-circuit 30 is configured to: in a reset period, transmit an initial voltage signal from the initial voltage terminal Vinit to the data writing sub-circuit 10, the leakage prevention sub-circuit 40 and the light-emitting device L in response to a reset scan signal from the second scan signal terminal S2 to reset the data writing sub-circuit 10, the leakage prevention sub-circuit 40 and the light-emitting device L.

The leakage prevention sub-circuit 40 is coupled to an auxiliary voltage terminal V0, the first scan signal terminal S1 and the data writing sub-circuit 10. The leakage prevention sub-circuit 40 is configured to: in a data writing period, store another light-emitting compensation signal V1; and in the light-emitting period, inhibit leakage of the reset sub-circuit 30 according to the another light-emitting compensation signal V1. The auxiliary voltage terminal V0 is configured to provide a constant voltage.

In this way, by utilizing the leakage prevention sub-circuit 40 to inhibit the leakage of the reset sub-circuit 30 alone, it may be ensured that the light-emitting compensation signal V1 output by the data writing sub-circuit 10 is stable, so that the data writing sub-circuit 10 may continuously assist in controlling the light-emitting control sub-circuit 20 to be turned on, and thus the light-emitting device L is effectively ensured to emit light of uniform brightness. As a result, the flickering problem of the display of the display device is avoided, and thus the display effect is improved.

It is worth noting that, in these embodiments, the data writing sub-circuit 10, the light-emitting control sub-circuit 20, the reset sub-circuit 30, the auxiliary voltage terminal V0, the first scan signal terminal S1 and other circuit elements other than the leakage prevention sub-circuit 40 can be arranged with reference to the circuit elements with the same names in the above embodiments, and connection relationships therebetween can also be set with reference to the connection relationships in the above embodiments, which will not be repeated here.

In some examples, as shown in FIG. 13A, the leakage prevention sub-circuit 40 includes a first storage capacitor C1 and a seventh transistor T7. A first electrode of the first storage capacitor C1 is coupled to the auxiliary voltage terminal (e.g., the initial voltage terminal Vinit), and a second electrode of the first storage capacitor C1 is coupled to the reset sub-circuit 30. A first electrode of the seventh transistor T7 is coupled to the second electrode of the first storage capacitor C1, a second electrode of the seventh transistor T7 is coupled to a first node N1 (i.e., a connection point between a control electrode of a driving transistor DT and a second electrode of a second storage capacitor C2) in the data writing sub-circuit 10, and a control electrode of the seventh transistor T7 is coupled to the first scan signal terminal S1. The first storage capacitor C1 is configured to be discharged in the light-emitting period to continuously provide the another light-emitting compensation signal to the reset sub-circuit 30.

For example, the reset sub-circuit 30 includes a fifth transistor T5 and a sixth transistor group. The sixth transistor group includes at least two sixth transistors that are connected in series. A control electrode of the fifth transistor T5 is coupled to the second scan signal terminal S2, a first electrode of the fifth transistor T5 is coupled to the initial voltage terminal Vinit, and a second electrode of the fifth transistor T5 is coupled to an anode of the light-emitting device L. Control electrodes of the sixth transistors (e.g., T61 and T62) in the sixth transistor group are all coupled to the second scan signal terminal S2, a first electrode of a first sixth transistor (e.g., T61) in the sixth transistor group is coupled to the first node N1 (i.e., the connection point between the control electrode of the driving transistor DT and the second electrode of the second storage capacitor C2) in the data writing sub-circuit 10, and a second electrode of a last sixth transistor (e.g., T62) in the sixth transistor group is coupled to the initial voltage terminal Vinit.

In this case, the second electrode of the first storage capacitor C1 is coupled to the reset sub-circuit 30, which means that the second electrode of the first storage capacitor C1 is coupled to a connection line between any two adjacent sixth transistors in the sixth transistor group.

In this way, in the light-emitting period, potentials of a second electrode and a first electrode of a sixth transistor coupled to the first storage capacitor C1 in the sixth transistor group are the same or approximately the same due to the another light-emitting compensation signal stored in the first storage capacitor C1, which prevents leakage of the sixth transistor coupled to the first node N1, and may thus inhibit leakage of the reset sub-circuit 30. As a result, it may further ensure that a potential of a third node N3 (i.e., a connection point between a second electrode of the first sixth transistor T61 and a first electrode of the second sixth transistor T62) is stable. Therefore, the light-emitting device L emits light of uniform brightness, so as to avoid a flickering problem of the display of the display device.

In some examples, referring to FIG. 13B, the number of the sixth transistors in the sixth transistor group is three, and the three sixth transistors may be arranged with reference to the first sixth transistor T61, the second sixth transistor T62 and the third sixth transistor T63 described in the above embodiments, which will not be repeated here. Similarly, for convenience of description, the connection point between the second electrode of the first sixth transistor T61 and the first electrode of the second sixth transistor T62 is defined as the third node N3 below. A connection point between a second electrode of the second sixth transistor T62 and a first electrode of the third sixth transistor T63 is defined as the fifth node N5.

In a case where there exists one first storage capacitor C1, for example, that the second electrode of the first storage capacitor C1 is coupled to the reset sub-circuit 30 means that the second electrode of the first storage capacitor C1 is coupled to the third node N3.

In this way, even if there is a large voltage difference between the first electrode of the second sixth transistor T62 and the second electrode of the third sixth transistor T63, so that the second sixth transistor T62 and the third sixth transistor T63 leak current to pull down a potential of the third node N3, the another light-emitting compensation signal V1 stored in the first storage capacitor C1 may also ensure that the potential of the third node N3 drops slowly over a period of time, and thus ensure that a potential of the first node N1 remains stable within the period of time.

In the case where there exists one first storage capacitor C1, as another example, that the second electrode of the first storage capacitor C1 is coupled to the reset sub-circuit 30 means that the second electrode of the first storage capacitor C1 is coupled to the fifth node N5.

In this way, even if there is a large voltage difference between the first electrode and the second electrode of the third sixth transistor T63, so that the third sixth transistor T63 leaks current to pull down a potential of the fifth node N5, the another light-emitting compensation signal V1 stored in the first storage capacitor C1 may also ensure that the potential of the fifth node N5 drops slowly over a period of time, and thus ensure that the potential of the first node N1 remains stable within the period of time.

In the case where there exist two first storage capacitors C1, second electrodes of the first storage capacitors C1 are coupled to the reset sub-circuit 30, which means that a second electrode of a first storage capacitor C1 is coupled to the third node N3, and a second electrode of another first storage capacitor C1 is coupled to the fifth node N5.

In this way, even if there is a large voltage difference between the first electrode and the second electrode of the third sixth transistor T63, so that the third sixth transistor T63 leaks current to pull down the potential of the fifth node N5, the light-emitting compensation signals V1 stored in the two first storage capacitors C1 may also ensure that potentials of the third node N3 and the fifth node N5 drop slowly over a period of time, and thus ensure that the potential of the first node N1 remains stable within the period of time.

Figure 14:
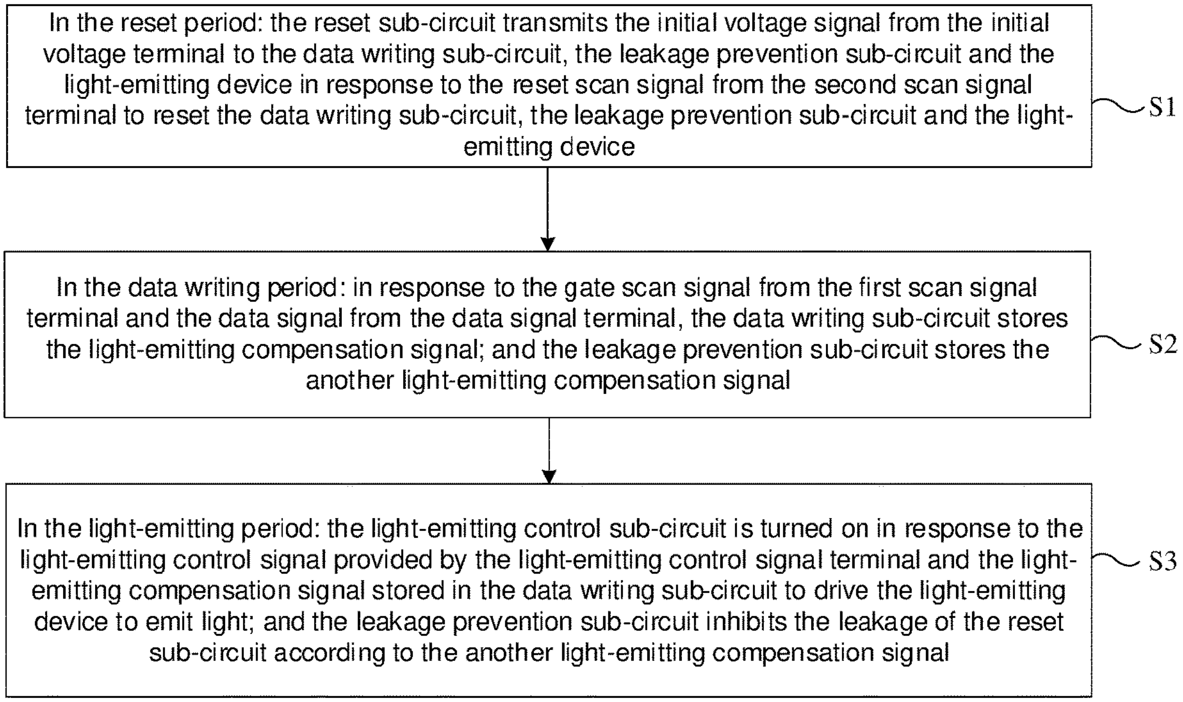
FIG. 14 is a flowchart of a driving method for a pixel driving circuit provided in some embodiments of the present disclosure.

Based on the structure of the pixel driving circuit 100 described in any one of the above embodiments, some embodiments of the present disclosure provide a driving method for the pixel driving circuit 100. As shown in FIG. 14, the driving method includes steps S1 to S3.

Figure 6A:
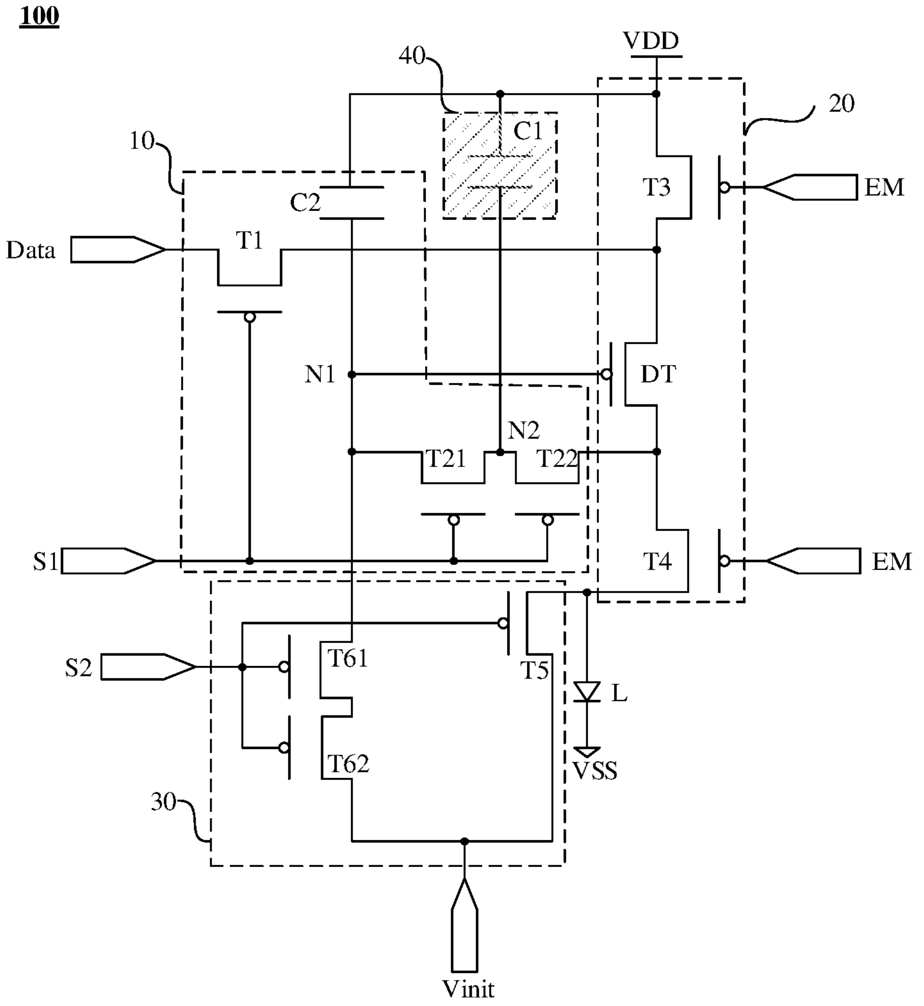
FIG. 6A is a configuration diagram of yet another pixel driving circuit provided in some embodiments of the present disclosure.
Figure 6B:
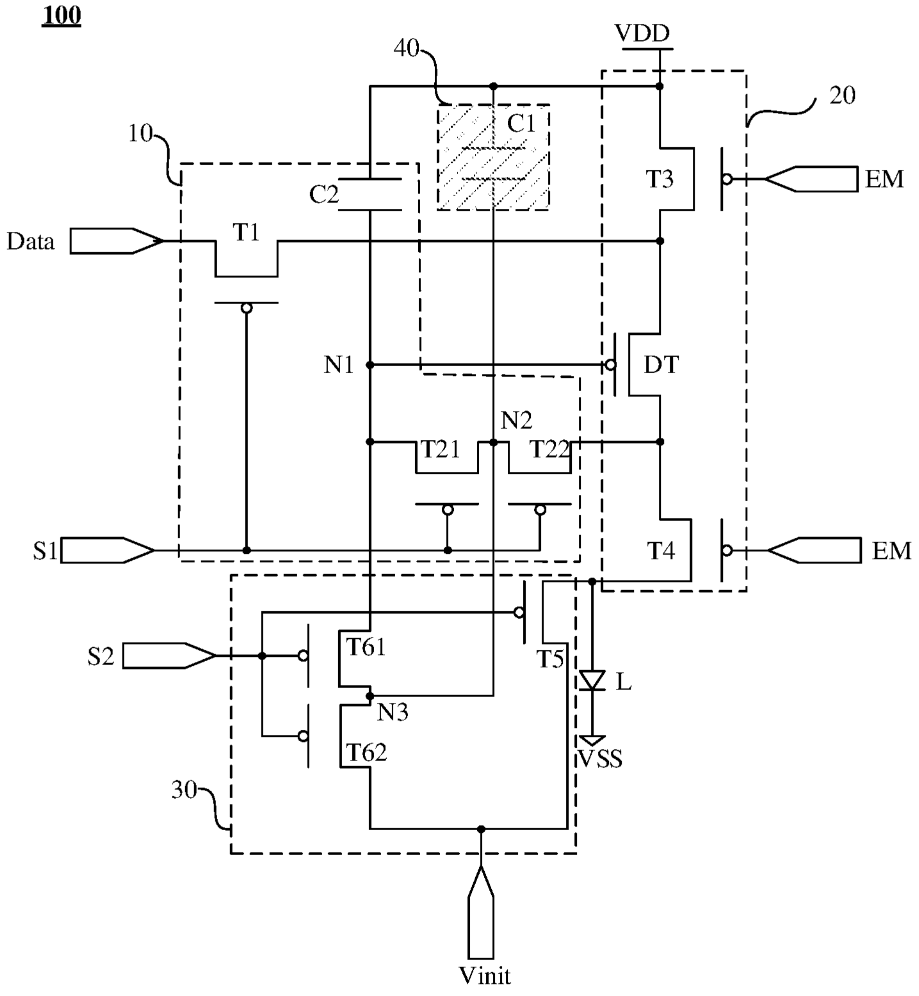
FIG. 6B is a configuration diagram of yet another pixel driving circuit provided in some embodiments of the present disclosure.
Figure 15:
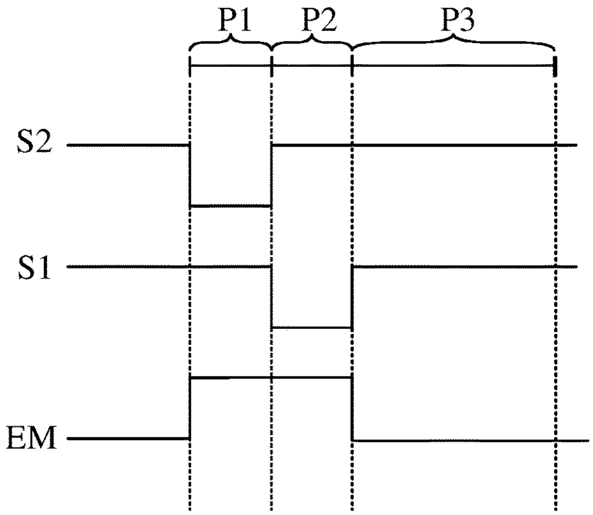
FIG. 15 is a timing diagram of a pixel driving circuit provided in some embodiments of the present disclosure.

Referring to FIGS. 6A, 6B and 13A, in a case where the display substrate including the pixel driving circuit 100 needs to display an image, in a light-emitting driving period, as shown in FIG. 15, a driving process of the pixel driving circuit 100 includes at least a reset period P1, a data writing period P2, and a light-emitting period P3.

In S1, in the reset period P1, the reset sub-circuit 30 transmits the initial voltage signal from the initial voltage terminal Vinit to the data writing sub-circuit 10, the leakage prevention sub-circuit 40 and the light-emitting device L in response to the reset scan signal from the second scan signal terminal S2 to reset the data writing sub-circuit 10, the leakage prevention sub-circuit 40 and the light-emitting device L.

In S2, in the data writing period P2, in response to the gate scan signal from the first scan signal terminal S1 and the data signal $V_{data}$ from the data signal terminal Data, the data writing sub-circuit 10 stores the light-emitting compensation signal V1. The leakage prevention sub-circuit 40 stores the another light-emitting compensation signal V1.

In S3, in the light-emitting period P3, the light-emitting control sub-circuit 20 is turned on in response to the light-emitting control signal provided by the light-emitting control signal terminal EM and the light-emitting compensation signal V1 stored in the data writing sub-circuit 10, so as to drive the light-emitting device L to emit light; and the leakage prevention sub-circuit 40 inhibits the leakage of the data writing sub-circuit 10 according to the another light-emitting compensation signal V1; or inhibits the leakage of the reset sub-circuit 30 according to the another light-emitting compensation signal V1; or inhibits the leakage of both the data writing sub-circuit 10 and the reset sub-circuit 30 according to the another light-emitting compensation signal V1.

For example, a specific working process of the pixel driving circuit 100 shown in each of FIGS. 6A, 6B and 13A will be described below with reference to FIG. 15. The following description will be described in an example where transistors in the pixel driving circuit 100 are P-type transistors, the first voltage transmitted by the first power supply voltage terminal VDD is at a high level, the second voltage transmitted by the second power supply voltage terminal VSS is at a low level, and the initial voltage signal transmitted by the initial voltage terminal Vinit is at a low level. Those skilled in the art will understand that, in the pixel driving circuit 100, if the first power supply voltage signal terminal VDD is connected to the second power supply voltage signal terminal VSS, the light-emitting device L emits light.

For example, in the following descriptions, "0" represents a low level, and "1" represents a high level.

Referring to FIGS. 6B, 13A and 15, in the reset period P1, EM=1, S1=1, and S2=0.

The fifth transistor T5 is turned on to transmit the initial voltage signal from the initial voltage terminal Vinit to the anode of the light-emitting device L, so as to reset the light-emitting device L.

The sixth transistors in the sixth transistor group are turned on to transmit the initial voltage signal from the initial voltage terminal Vinit to the first storage capacitor C1 and the second storage capacitor C2, so as to reset the first storage capacitor C1 and the second storage capacitor C2, i.e., the data writing sub-circuit 10 and the leakage prevention sub-circuit 40. The first storage capacitor C1 and the second storage capacitor C2 each store a respective initial voltage signal.

The third transistor T3, the fourth transistor T4 and the driving transistor DT are turned off, so that the first power supply voltage signal terminal VDD and the second power supply voltage signal terminal VSS are disconnected, and thus the light-emitting device L does not emit light.

In the data writing period P2, EM=1, S1=0, and S2=1.

The second storage capacitor C2 is discharged, so that a potential of the first node N1 is a potential of the initial voltage signal stored in the second storage capacitor C2 to control the driving transistor DT to be turned on. The first transistor T1 is turned on, and the second transistors in the second transistor group are turned on. In this case, the first storage capacitor C1 and the second storage capacitor C2 are written with respective light-emitting compensation signals V1 in response to the data signal from the data signal terminal Data. It will be noted that, in a case where the leakage prevention sub-circuit 40 further includes the seventh transistor T7 (referring to FIGS. 13A and 13B), in the data writing period, the seventh transistor T7 is also turned on, so that a light-emitting compensation signal V1 may be successfully written into the first storage capacitor C1.

Here, a threshold voltage of the driving transistor DT is $V_{th}$, and under an action of the data signal $V_{data}$ from the data signal terminal Data, the light-emitting compensation signal V1 is $(V_{data}+V_{th})$. It will be understood that the driving transistor DT is a P-type transistor, and thus $V_{th}$ is a negative value.

The third transistor T3 and the fourth transistor T4 are turned off, so that the first power supply voltage signal terminal VDD and the second power supply voltage signal terminal VSS are disconnected, and thus the light-emitting device L does not emit light.

In the light-emitting period P3, EM=0, S=1, and S2=1.

The third transistor T3 and the fourth transistor T4 are turned on, so that the first voltage Vdd provided by the first power supply voltage terminal VDD is transmitted to the first electrode of the driving transistor DT. The second storage capacitor C2 is discharged, so that the potential of the first node N1 is $(V_{data}+V_{th})$. That is, the potential of the control electrode of the driving transistor DT is $(V_{data}+V_{th})$.

By controlling the data signal $V_{data}$ provided by the data signal terminal Data, the potential of the control electrode of the driving transistor DT is less than the potential of the first electrode thereof (i.e., $V_{data}+V_{th}<Vdd$), so that the driving transistor DT may be controlled to be turned on.

In this case, the first power supply voltage signal terminal VDD is connected to the second power supply voltage signal terminal VSS, and thus the light-emitting device L emits light, so that a sub-pixel driven by the pixel driving circuit 100 realizes the display function.

Meanwhile, the second transistors in the second transistor group are all turned off. The sixth transistors in the sixth transistor group are all turned off. The first storage capacitor C1 is discharged, so that potentials of the second node N2 and the third node N3 are $(V_{data}+V_{th})$.

In the case where the leakage prevention sub-circuit 40 inhibits the leakage of the data writing sub-circuit 10 according to the another light-emitting compensation signal V1, referring to FIG. 6A, a source-drain voltage of a second transistor (e.g., the first second transistor T21 in FIG. 6A) coupled between the first node N1 and the second node N2 is $[V_{data}+V_{th}-(V_{data}+V_{th})]$, which is equal to 0, and thus the second transistor will not leak current. In this way, it may be possible to ensure that the potential of the first node N1 will not be pulled down due to the leakage of the second transistor coupled thereto (that is, the potential of the first node N1 may keep stable), so that the driving transistor DT may be stably controlled. As a result, it is ensured that a current flowing to the light-emitting device L is stable, and thus the light-emitting device L may continuously emit light of uniform brightness.

In the case where the leakage prevention sub-circuit 40 inhibits the leakage of both the data writing sub-circuit 10 and the reset sub-circuit 30 according to the another light-emitting compensation signal V1, referring to FIG. 6B, a source-drain voltage of a sixth transistor (e.g., the first sixth transistor T61 in FIG. 6B) coupled between the first node N1 and the third node N3 is $[V_{data}+V_{th}-(V_{data}+V_{th})]$, which is equal to 0, and thus the sixth transistor will not leak current. In this way, it may be possible to ensure that the potential of the first node N1 will not be pulled down due to the leakage of the second transistor and the sixth transistor coupled thereto (that is, the potential of the first node N1 may keep stable), so that the driving transistor DT may be stably controlled. As a result, it is ensured that a current flowing to the light-emitting device L is stable, and thus the light-emitting device L may continuously emit light of uniform brightness.

In the case where the leakage prevention sub-circuit 40 inhibits the leakage of the reset sub-circuit 30 according to the another light-emitting compensation signal V1, referring to FIG. 13A, the source-drain voltage of a sixth transistor (e.g., the first sixth transistor T61 in FIG. 13A) coupled between the first node N1 and the third node N3 is $[V_{data}+V_{th}-(V_{data}+V_{th})]$, which is equal to 0, and thus the sixth transistor will not leak current. In this way, it may be possible to ensure that the potential of the first node N1 will not be pulled down due to the leakage of the sixth transistor coupled thereto (that is, the potential of the first node N1 may keep stable), so that the driving transistor DT may be stably controlled. As a result, it is ensured that a current flowing to the light-emitting device L is stable, and thus the light-emitting device L may continuously emit light of uniform brightness.

It will be added that the specific working process of the pixel driving circuit 100 is schematically illustrated with the structures shown in FIGS. 6A, 6B and 13A. A stabilization process of the another light-emitting compensation signal V1 stored in the first storage capacitor C1 to the potential of the first node N1 is related to the number of the first storage capacitor(s) C1, connections between the first storage capacitor C1 and a corresponding node in the second transistor group, and between the first storage capacitor C1 and a corresponding node in the sixth transistor group. In the case where the first storage capacitor C1 is further coupled to the fourth node N4 and the fifth node N5 (referring to FIGS. 8B and 9B), the stabilization process of the another light-emitting compensation signal V1 stored in the first storage capacitor C1 to the potential of the first node N1 may refer to the relevant descriptions in the above embodiments, and details will not be repeated here.

The display substrate 200 provided in some embodiments of the present disclosure includes the pixel driving circuit 100 provided in any of the above embodiments. The pixel driving circuit 100 is configured to drive a sub-pixel to emit light.

Beneficial effects achieved by the display substrate 200 provided in the embodiments of the present disclosure are the same as the beneficial effects achieved by the pixel driving circuit 100 provided in the above embodiments, which will not be repeated here.

In addition, a display device 300 provided in some embodiments of the present disclosure includes the display substrate 200 provided in any of the embodiments. Therefore, beneficial effects achieved by the display device 300 are the same as the beneficial effects achieved by the display substrate 200 provided in the above embodiment, which will not be repeated here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel driving circuit, comprising a data writing sub-circuit, a light-emitting control sub-circuit, a reset sub-circuit and a leakage prevention sub-circuit, wherein the data writing sub-circuit is coupled to a first scan signal terminal, a data signal terminal, a first power supply voltage terminal and the light-emitting control sub-circuit; the data writing sub-circuit is configured to: in a data writing period, store a light-emitting compensation signal in response to a gate scan signal from the first scan signal terminal and a data signal from the data signal terminal; and in a light-emitting period, assist in controlling the light-emitting control sub-circuit to be turned on according to the light-emitting compensation signal;

the light-emitting control sub-circuit is coupled to the first power supply voltage terminal, a light-emitting control signal terminal and a light-emitting device, and the light-emitting device is further coupled to a second power supply voltage terminal; the light-emitting control sub-circuit is configured to be turned on in response to a light-emitting control signal provided by the light-emitting control signal terminal and the light-emitting compensation signal stored in the data writing sub-circuit in the light-emitting period, so as to drive the light-emitting device to emit light; the reset sub-circuit is coupled to a second scan signal terminal, an initial voltage terminal, the leakage prevention sub-circuit, the data writing sub-circuit and the light-emitting device;

the reset sub-circuit is configured to: in a reset period, transmit an initial voltage signal from the initial voltage terminal to the data writing sub-circuit, the leakage prevention sub-circuit and the light-emitting device in response to a reset scan signal from the second scan signal terminal to reset the data writing sub-circuit, the leakage prevention sub-circuit and the light-emitting device; and the leakage prevention sub-circuit is coupled to an auxiliary voltage terminal, the first scan signal terminal and the data writing sub-circuit; the leakage prevention sub-circuit is configured to: in the data writing period, store another light-emitting compensation signal; and in the light-emitting period, inhibit leakage of the reset sub-circuit according to the another light-emitting compensation signal;

wherein the auxiliary voltage terminal is configured to provide a constant voltage;

the auxiliary voltage terminal and the initial voltage terminal in the pixel driving circuit are the same voltage terminal:

wherein the leakage prevention sub-circuit includes:

two first storage capacitors, wherein first electrodes of the two first storage capacitors are coupled to the initial voltage terminal, and second electrodes of the two first storage capacitors are coupled to the reset sub-circuit; and a seventh transistor, wherein a first electrode of the seventh transistor is coupled to the second electrodes of the two first storage capacitors, a second electrode of the seventh transistor is coupled to the data writing sub-circuit, and a control electrode of the seventh transistor is coupled to the first scan signal terminal;

wherein the two first storage capacitors are configured to be discharged in the light-emitting period to continuously provide the another light-emitting compensation signal to the reset sub-circuit;

wherein the reset sub-circuit includes a fifth transistor and a sixth transistor group; the sixth transistor group includes at least two sixth transistors that are connected in series, wherein a control electrode of the fifth transistor is coupled to the second scan signal terminal, a first electrode of the fifth transistor is coupled to the initial voltage terminal, and a second electrode of the fifth transistor is coupled to an anode of the light-emitting device;

control electrodes of all the sixth transistors in the sixth transistor group are coupled to the second scan signal terminal, a first electrode of a first sixth transistor in the sixth transistor group is coupled to the data writing sub-circuit, and a second electrode of a last sixth transistor in the sixth transistor group is coupled to the initial voltage terminal; and a second electrode of one of the first storage capacitors is coupled to a connection line between any two adjacent sixth transistors in the sixth transistor group.

2. The pixel driving circuit according to claim 1, wherein the sixth transistors in the sixth transistor group are oxide semiconductor thin film transistors.

3. The pixel driving circuit according to claim 1, wherein the sixth transistor group includes three sixth transistors that are connected in series.

4. The pixel driving circuit according to claim 3, wherein a second electrode of a first storage capacitor is coupled to the connection line between the first sixth transistor and a second sixth transistor, and a second electrode of another first storage capacitor is coupled to the connection line between the second sixth transistor and a third sixth transistor.

5. The pixel driving circuit according to claim 1, wherein the data writing sub-circuit includes a second storage capacitor, the light-emitting control sub-circuit includes a driving transistor, and a second electrode of the second storage capacitor is coupled to a control electrode of the driving transistor, wherein the second electrode of the seventh transistor and the first electrode of the first sixth transistor in the sixth transistor group are both coupled to the second electrode of the second storage capacitor.

6. The pixel driving circuit according to claim 5, wherein a first electrode of the second storage capacitor is coupled to the first power supply voltage terminal.

7. The pixel driving circuit according to claim 6, wherein the data writing sub-circuit further includes a first transistor and a second transistor group, wherein a control electrode of the first transistor is coupled to the first scan signal terminal, a first electrode of the first transistor is coupled to the data signal terminal, and a second electrode of the first transistor is coupled to a first electrode of the driving transistor; and the second transistor group includes at least two second transistors that are connected in series; control electrodes of all the second transistors in the second transistor group are coupled to the first scan signal terminal, a first electrode of a first second transistor in the second transistor group is coupled to the control electrode of the driving transistor, and a second electrode of a last second transistor in the second transistor group is coupled to a second electrode of the driving transistor.

8. The pixel driving circuit according to claim 7, wherein the second transistors in the second transistor group are oxide semiconductor thin film transistors.

9. The pixel driving circuit according to claim 7, wherein the number of the second transistors in the second transistor group is two.

10. The pixel driving circuit according to claim 5, wherein the light-emitting control sub-circuit further includes a third transistor and a fourth transistor, wherein a control electrode of the third transistor is coupled to the light-emitting control signal terminal, a first electrode of the third transistor is coupled to the first power supply voltage terminal, and a second electrode of the third transistor is coupled to a first electrode of the driving transistor; and a control electrode of the fourth transistor is coupled to the light-emitting control signal terminal, a first electrode of the fourth transistor is coupled to a second electrode of the driving transistor, and a second electrode of the fourth transistor is coupled to the anode of the light-emitting device.

11. A driving method for the pixel driving circuit according to claim 1, wherein a light-emitting driving period includes the reset period, the data writing period and the light-emitting period;

the driving method comprises:

in the reset period: transmitting, by the reset sub-circuit, the initial voltage signal from the initial voltage terminal to the data writing sub-circuit, the leakage prevention sub-circuit and the light-emitting device in response to the reset scan signal from the second scan signal terminal to reset the data writing sub-circuit, the leakage prevention sub-circuit and the light-emitting device;

in the data writing period: in response to the gate scan signal from the first scan signal terminal and the data signal from the data signal terminal, storing, by the data writing sub-circuit, the light-emitting compensation signal; and storing, by the leakage prevention sub-circuit, the another light-emitting compensation signal; and in the light-emitting period: the light-emitting control sub-circuit being turned on in response to the light-emitting control signal provided by the light-emitting control signal terminal and the light-emitting compensation signal stored in the data writing sub-circuit to drive the light-emitting device to emit light; and inhibiting, by the leakage prevention sub-circuit, the leakage of the reset sub-circuit according to the another light-emitting compensation signal.

12. A display substrate, comprising:

the pixel driving circuit according to claim 1.

13. A display device, comprising:

the display substrate according to claim 12.

* * * * *